Oct. 3, 1933.  C. A. BICKEL ET AL  1,929,269
APPARATUS FOR AUTOMATIC FORM TURNING LATHES
Filed Dec. 28, 1931    22 Sheets-Sheet 2
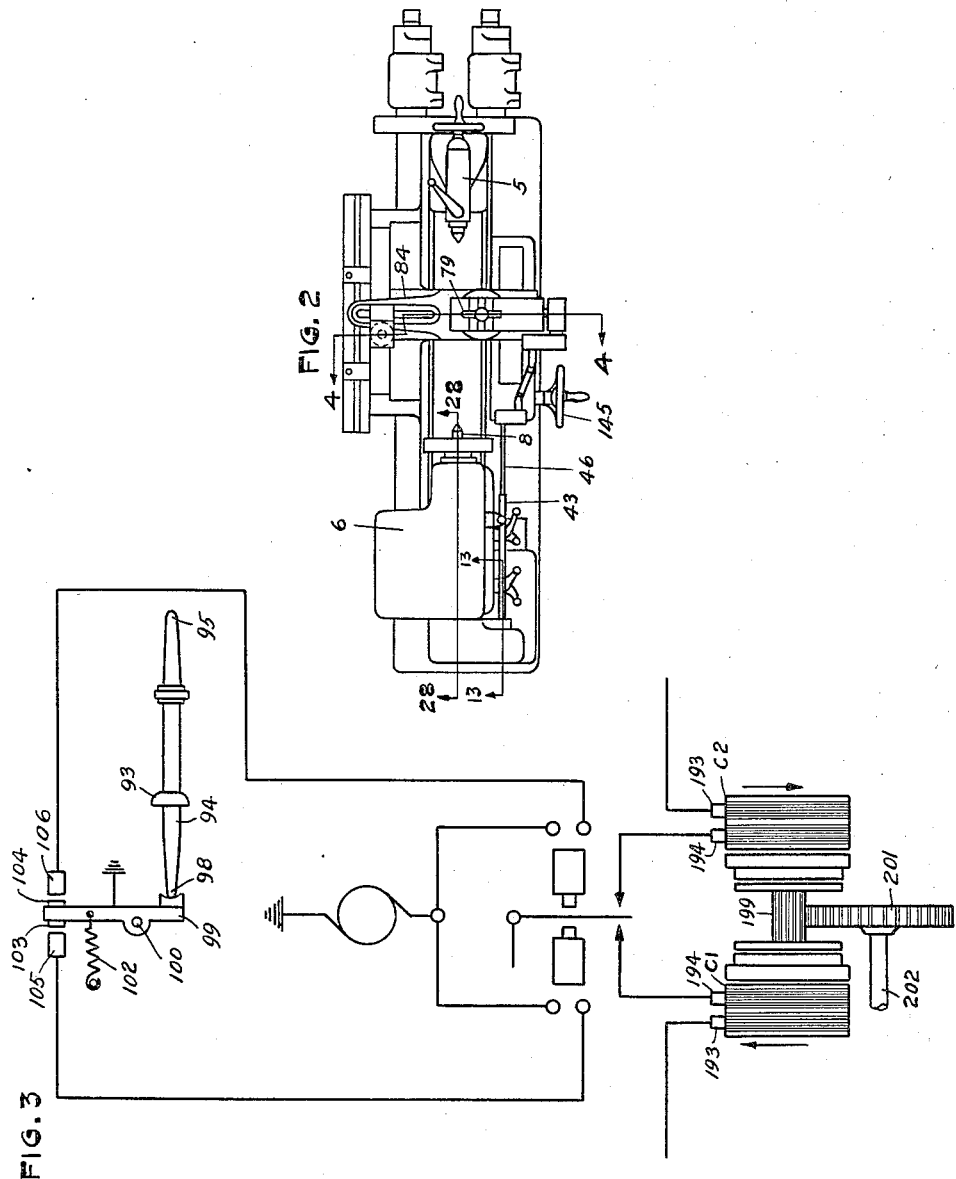
INVENTORS
CLIFFORD A. BICKEL.
PHILBER A. ABE.
BY
ATTORNEYS

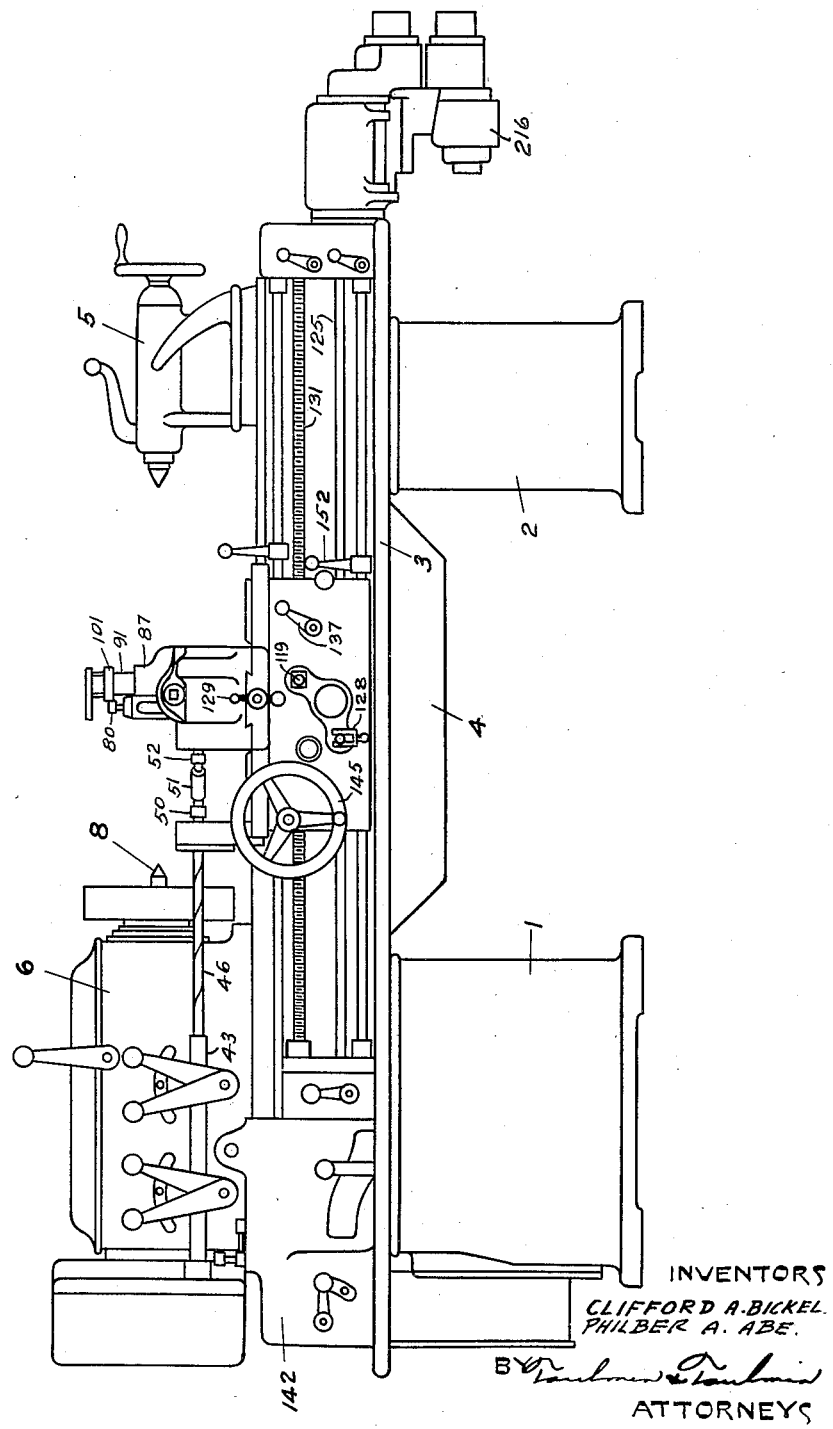

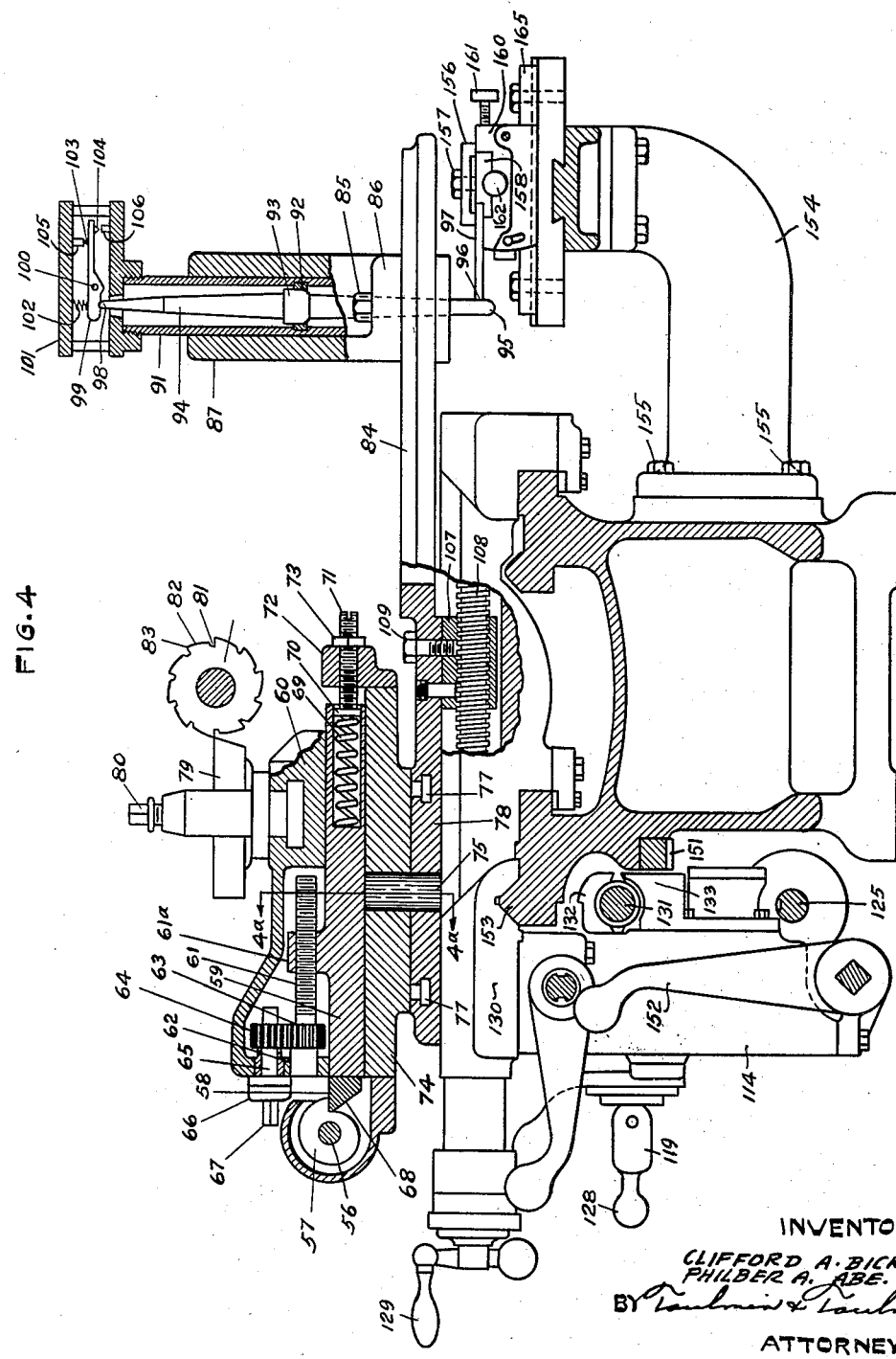

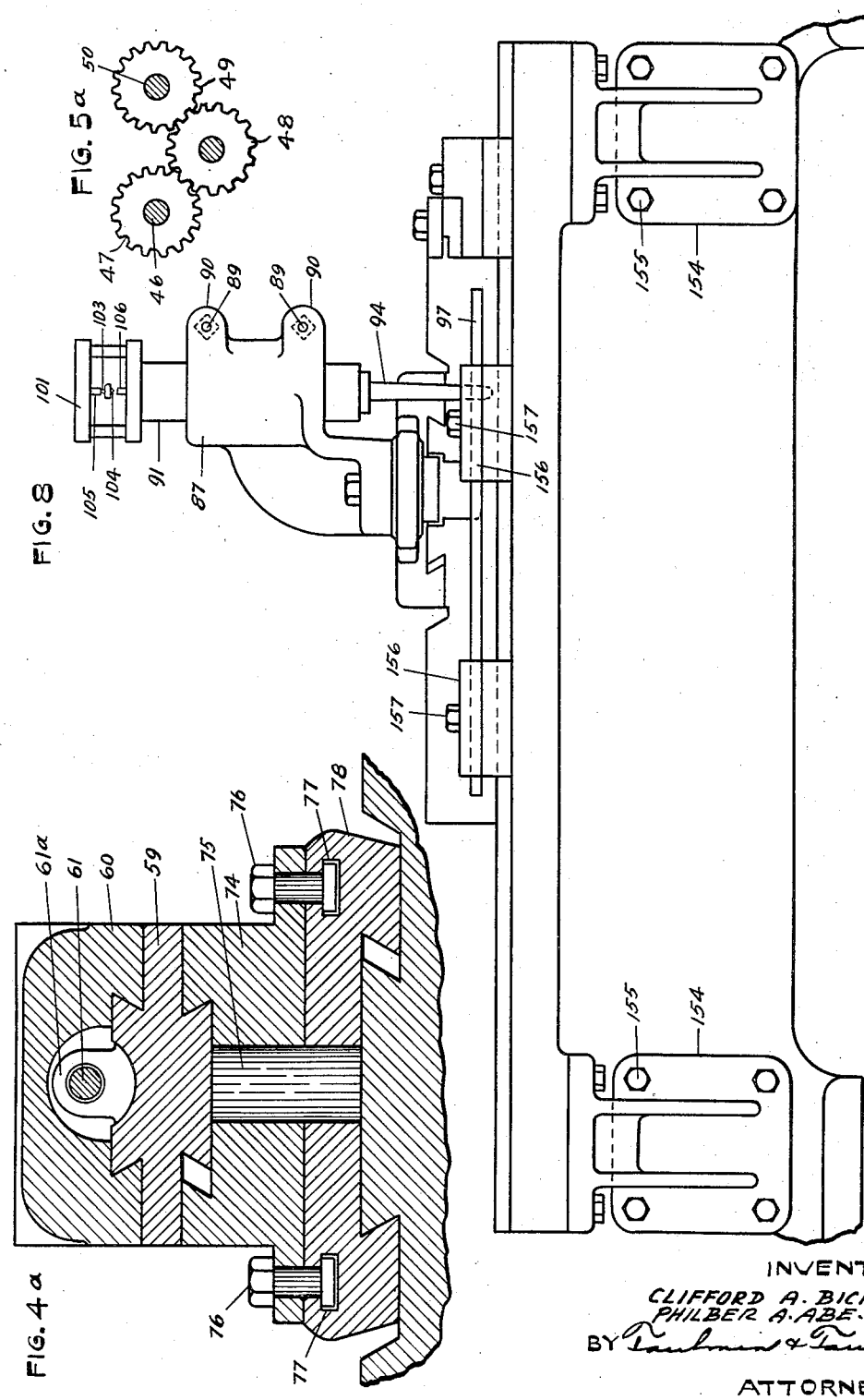

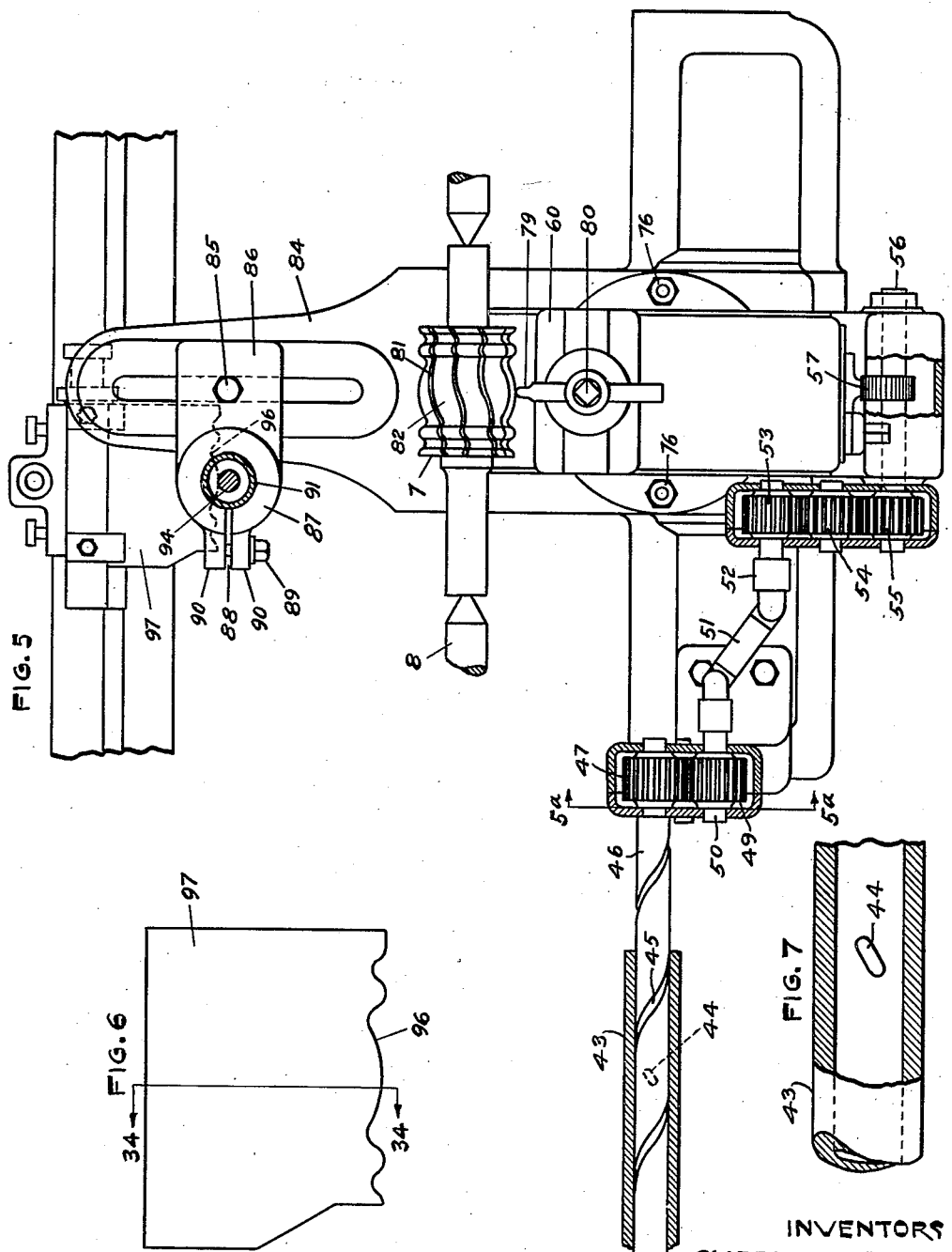

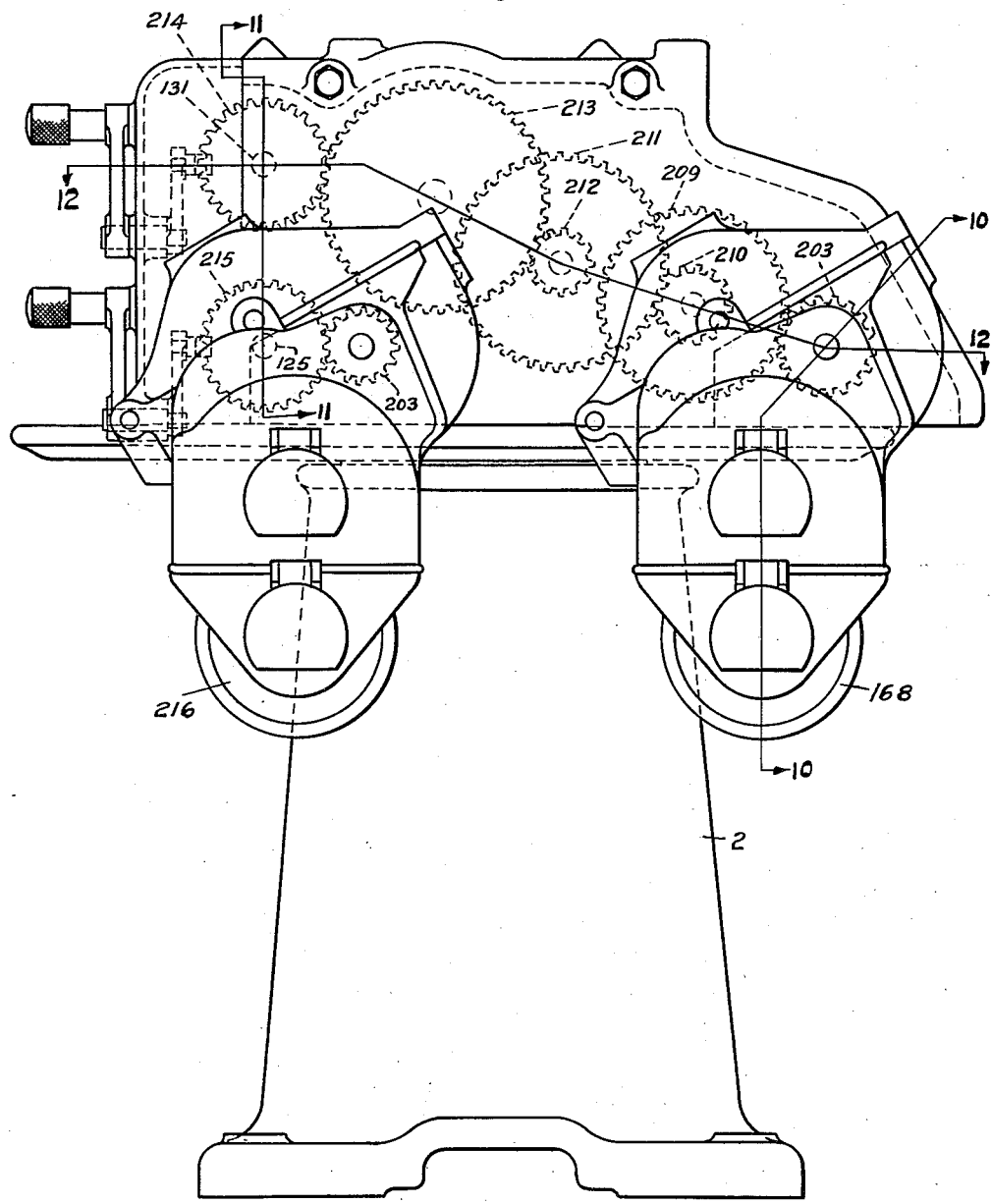

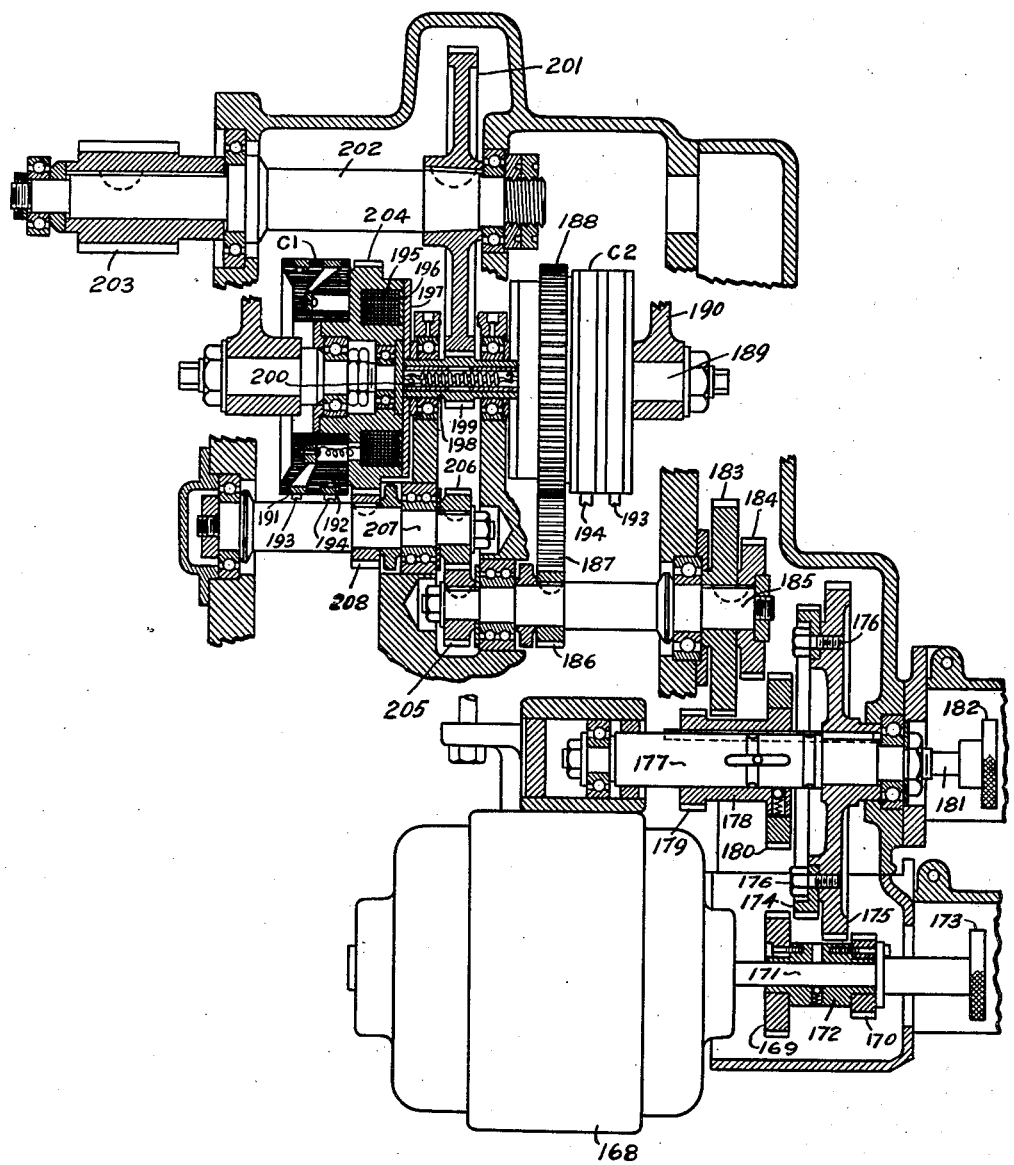

Oct. 3, 1933.   C. A. BICKEL ET AL   1,929,269
APPARATUS FOR AUTOMATIC FORM TURNING LATHES
Filed Dec. 28, 1931   22 Sheets-Sheet 8

INVENTORS
CLIFFORD A. BICKEL.
PHILBER A. ABE.
BY
ATTORNEYS

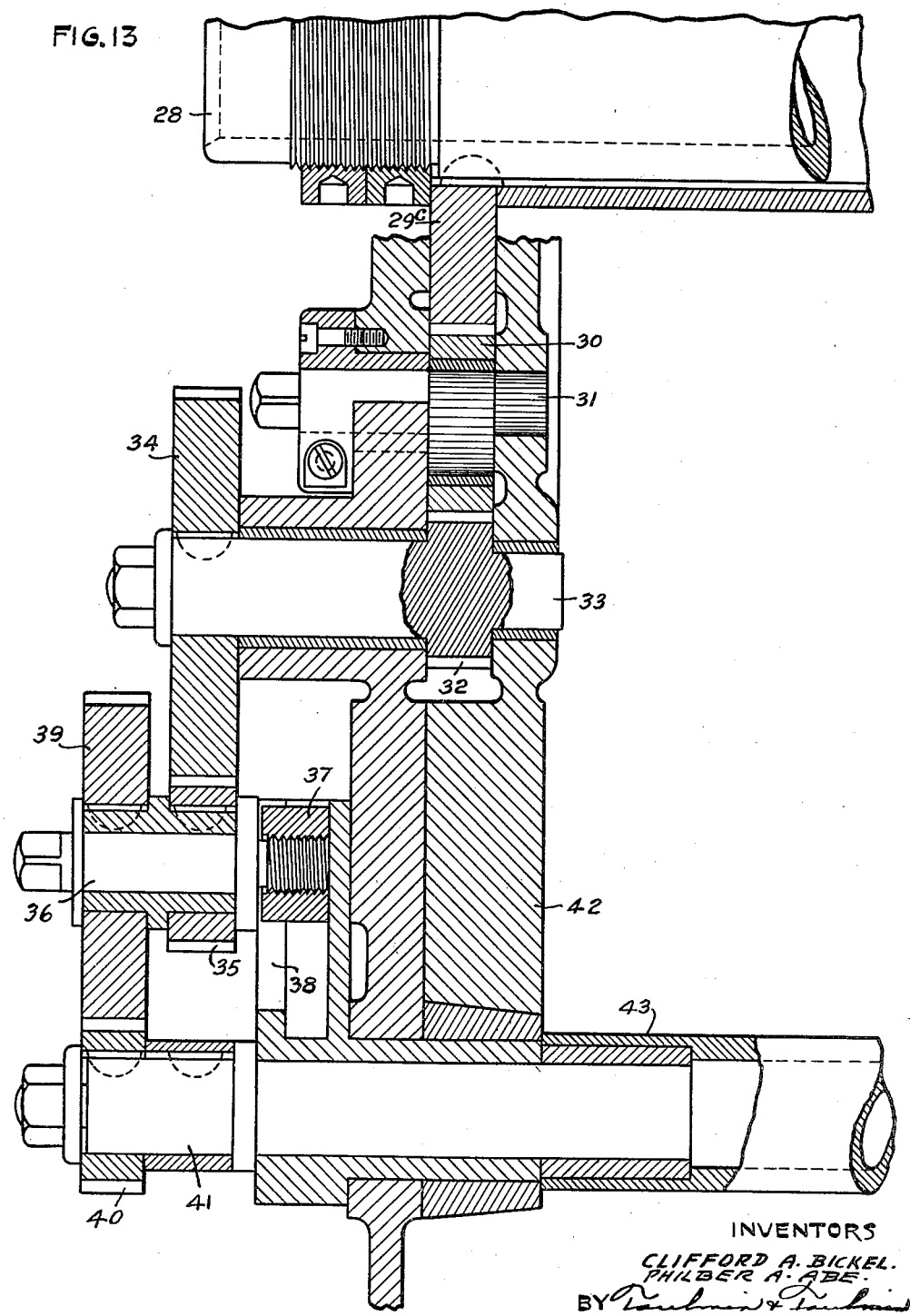

Oct. 3, 1933. C. A. BICKEL ET AL 1,929,269
APPARATUS FOR AUTOMATIC FORM TURNING LATHES
Filed Dec. 28, 1931 22 Sheets-Sheet 10
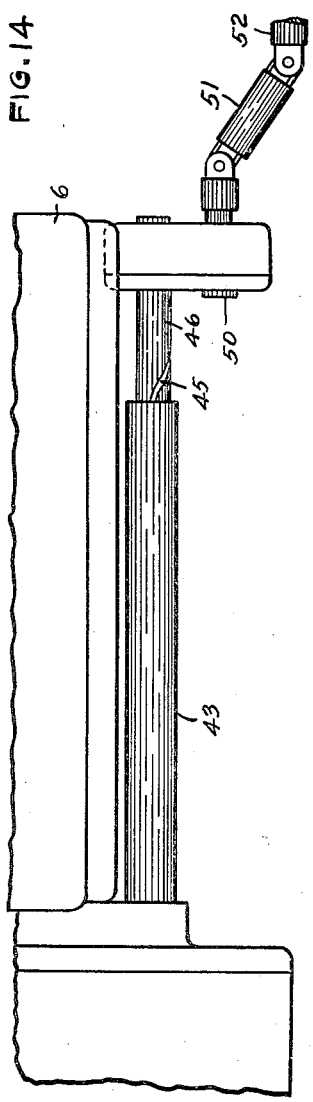
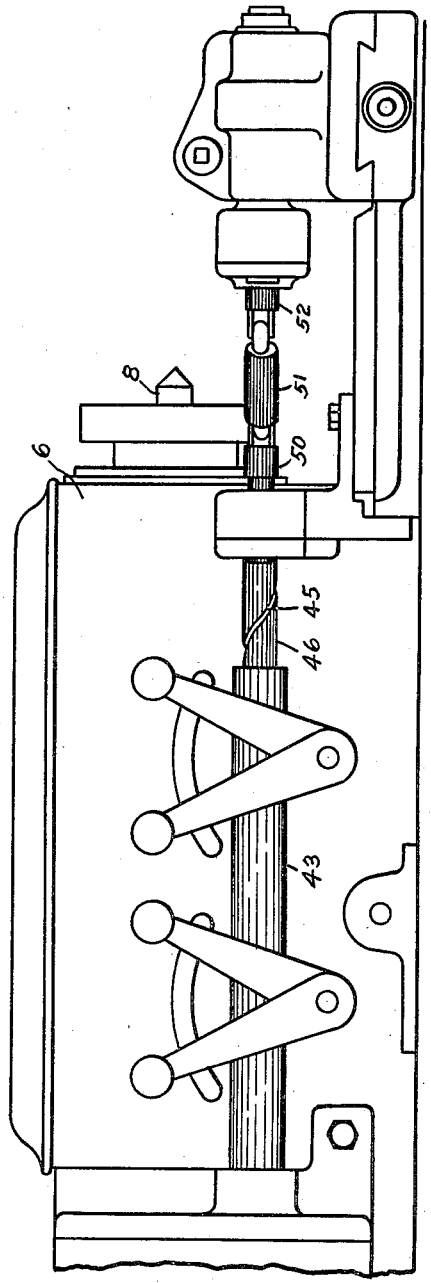
INVENTORS
CLIFFORD A. BICKEL.
PHILBER A. ABE.
BY
ATTORNEYS Oct. 3, 1933.  C. A. BICKEL ET AL  1,929,269
APPARATUS FOR AUTOMATIC FORM TURNING LATHES
Filed Dec. 28, 1931  22 Sheets-Sheet 11

INVENTORS
CLIFFORD A. BICKEL
PHILBER A. ABE.
BY
ATTORNEYS

Oct. 3, 1933.   C. A. BICKEL ET AL   1,929,269
APPARATUS FOR AUTOMATIC FORM TURNING LATHES
Filed Dec. 28, 1931   22 Sheets-Sheet 13
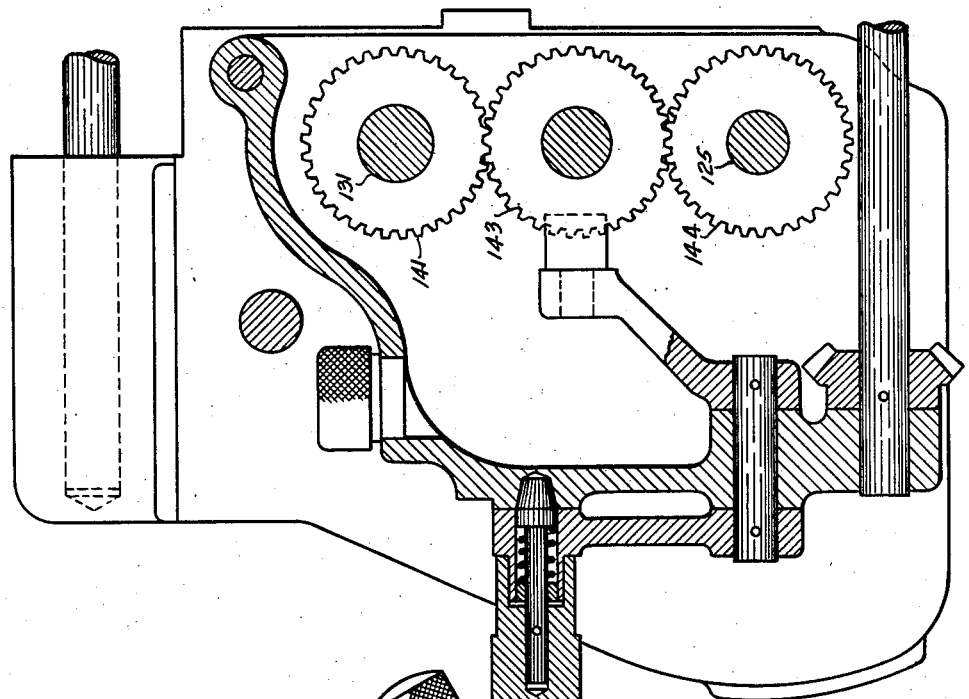
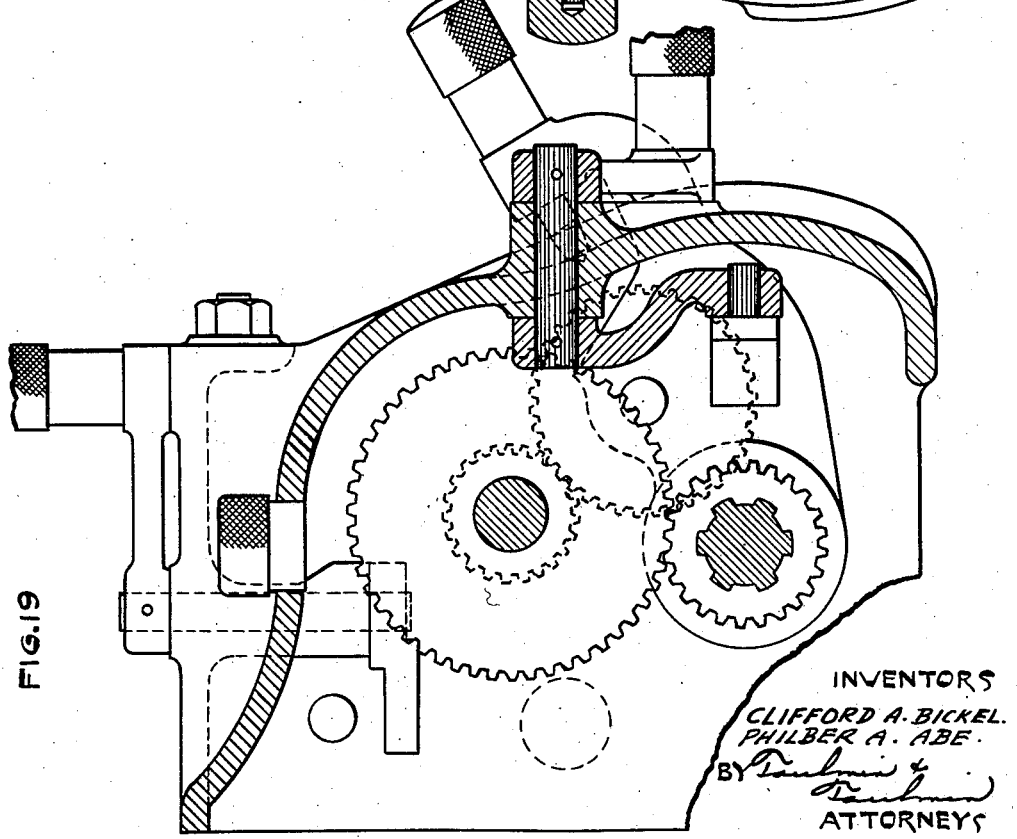
INVENTORS
CLIFFORD A. BICKEL.
PHILBER A. ABE.
BY
ATTORNEYS Oct. 3, 1933.　　　C. A. BICKEL ET AL　　　1,929,269
APPARATUS FOR AUTOMATIC FORM TURNING LATHES
Filed Dec. 28, 1931　　22 Sheets-Sheet 14

INVENTORS
CLIFFORD A. BICKEL.
PHILBER A. ABE.
BY
ATTORNEYS

Oct. 3, 1933.  C. A. BICKEL ET AL  1,929,269
APPARATUS FOR AUTOMATIC FORM TURNING LATHES
Filed Dec. 28, 1931   22 Sheets-Sheet 15
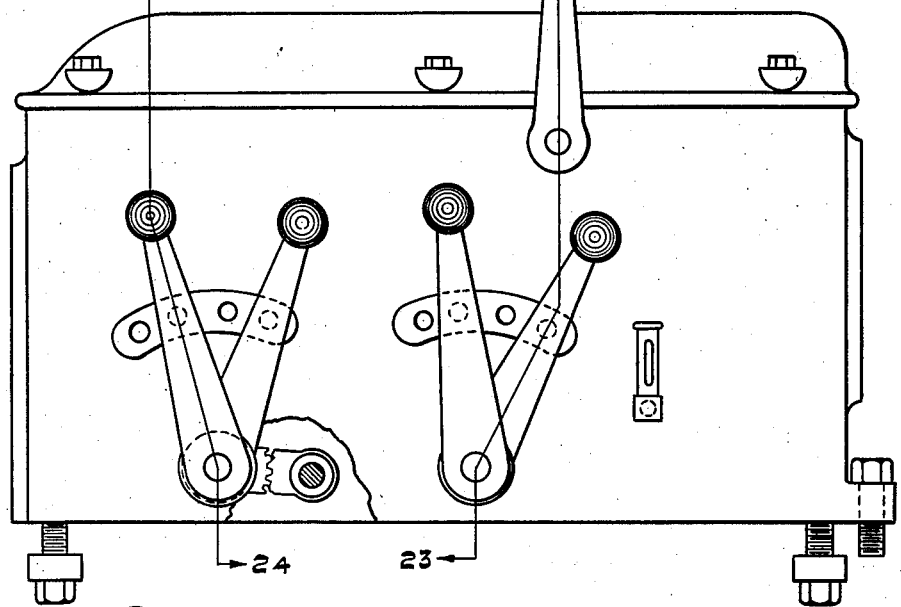
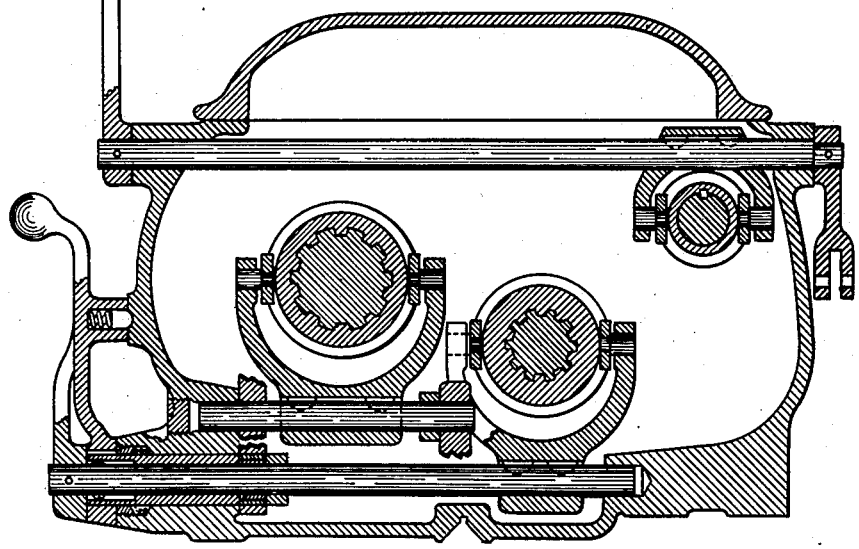
INVENTORS
CLIFFORD A. BICKEL.
PHILBER A. ABE.
BY
ATTORNEYS Oct. 3, 1933.   C. A. BICKEL ET AL   1,929,269
APPARATUS FOR AUTOMATIC FORM TURNING LATHES
Filed Dec. 28, 1931   22 Sheets-Sheet 16

INVENTORS
CLIFFORD A. BICKEL.
PHILBER A. ABE.
BY
ATTORNEYS

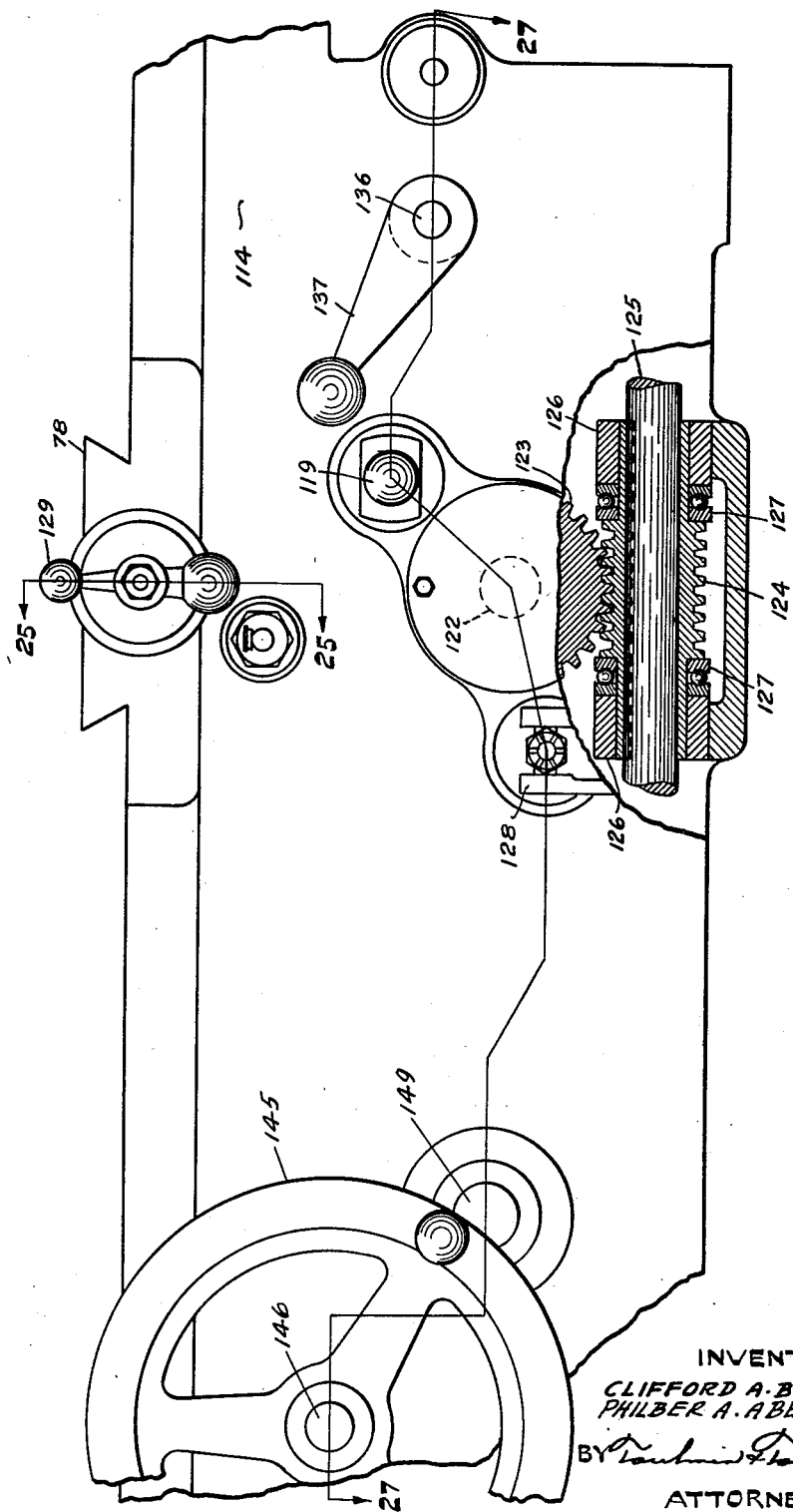

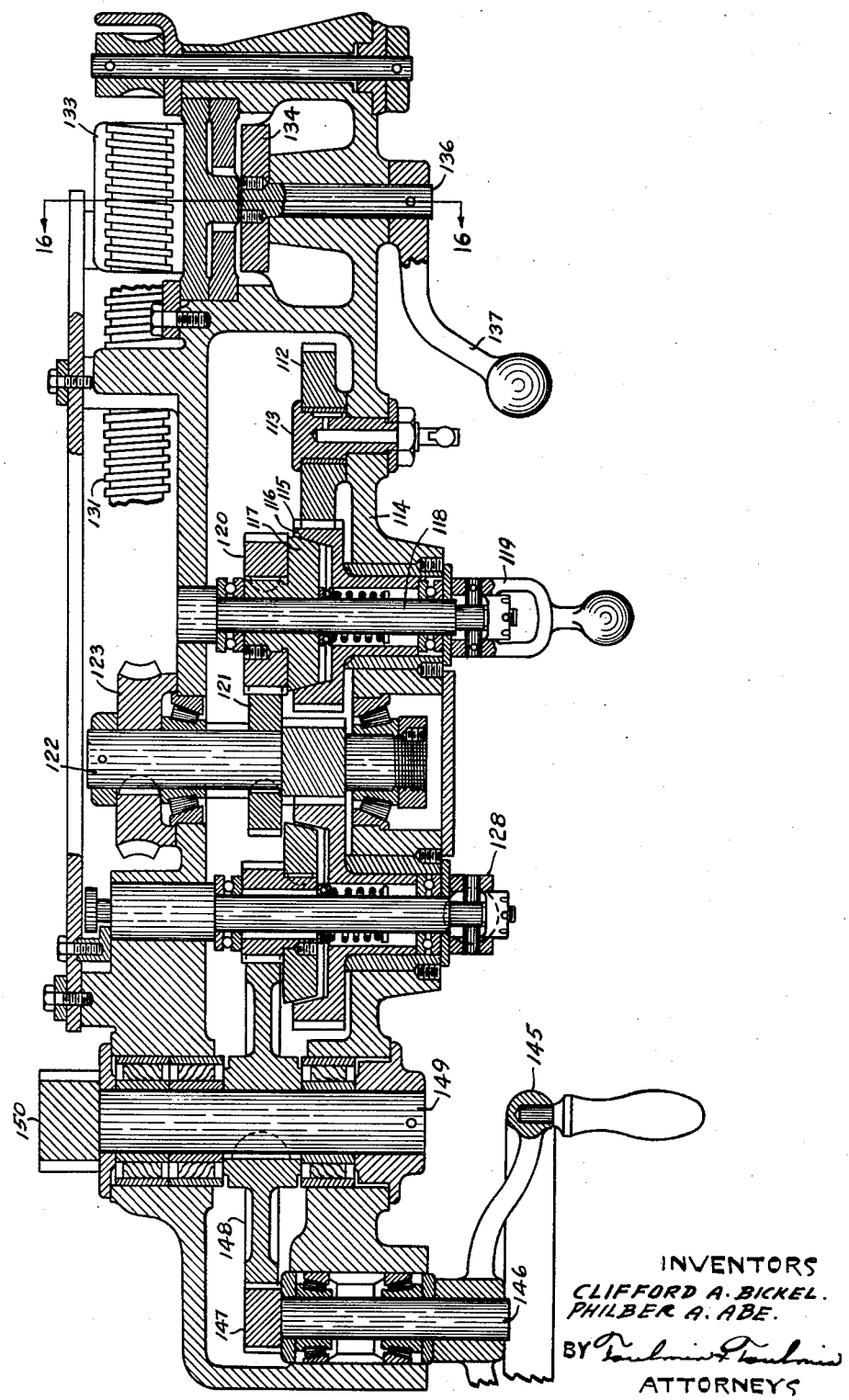

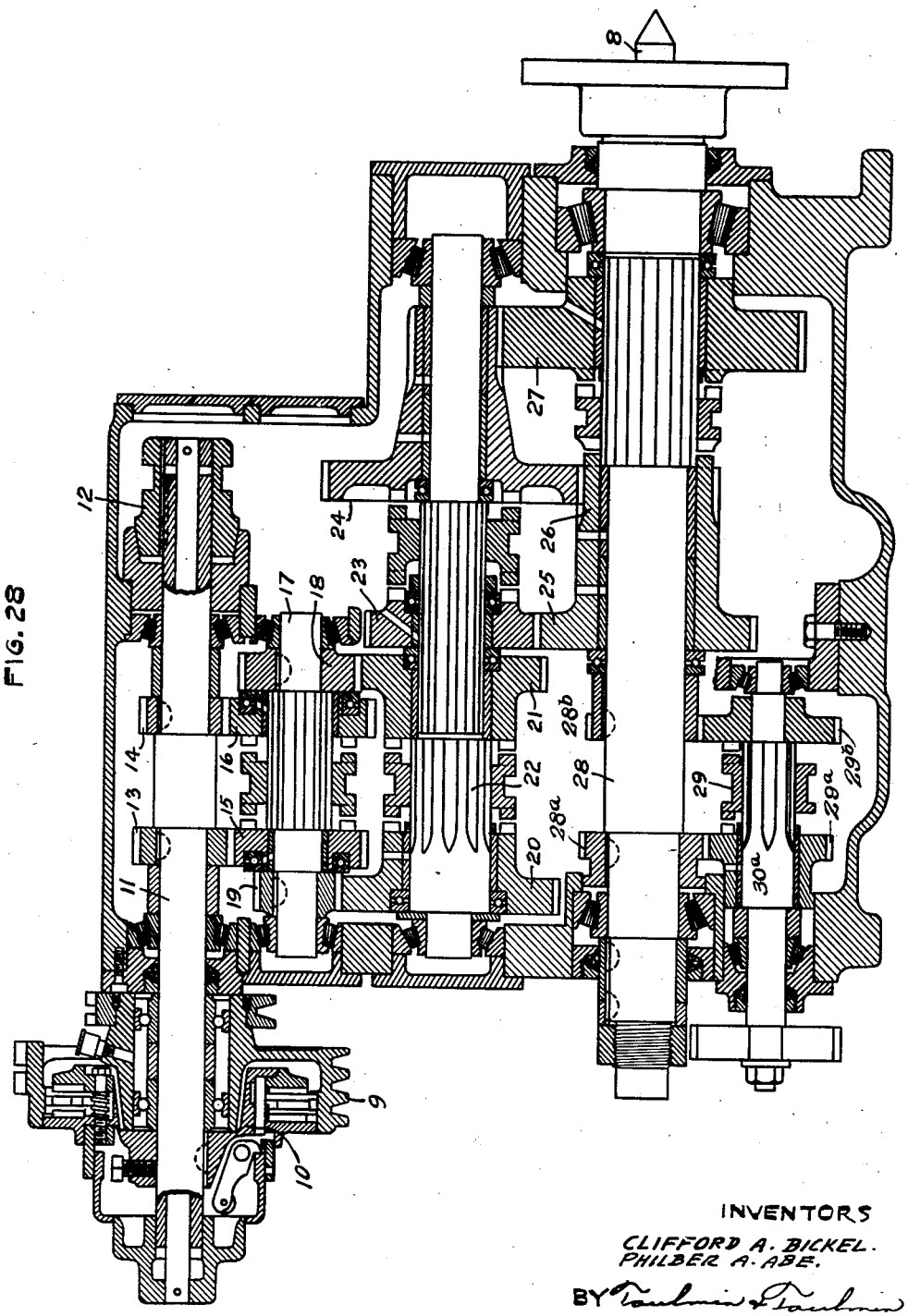

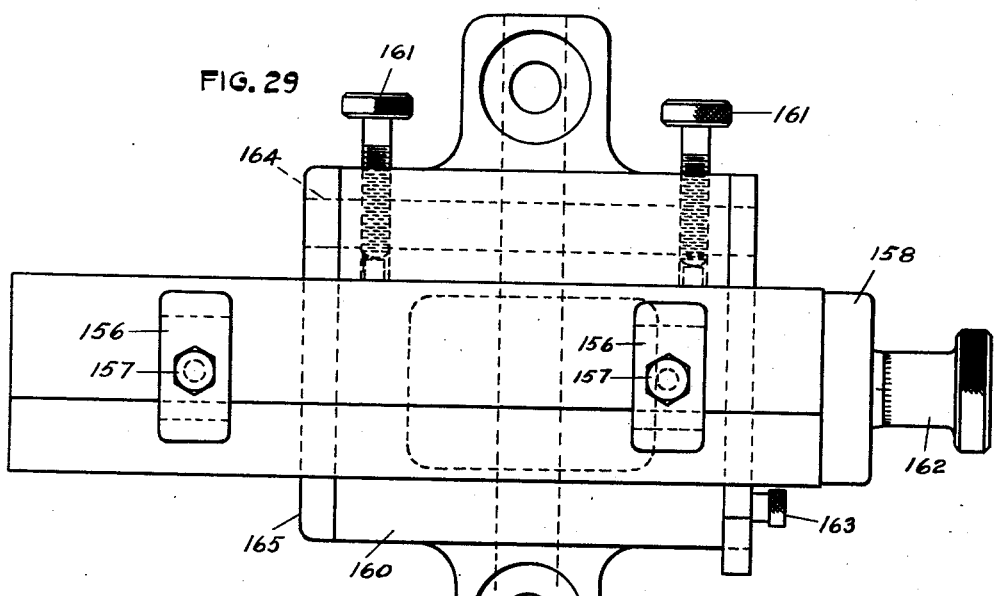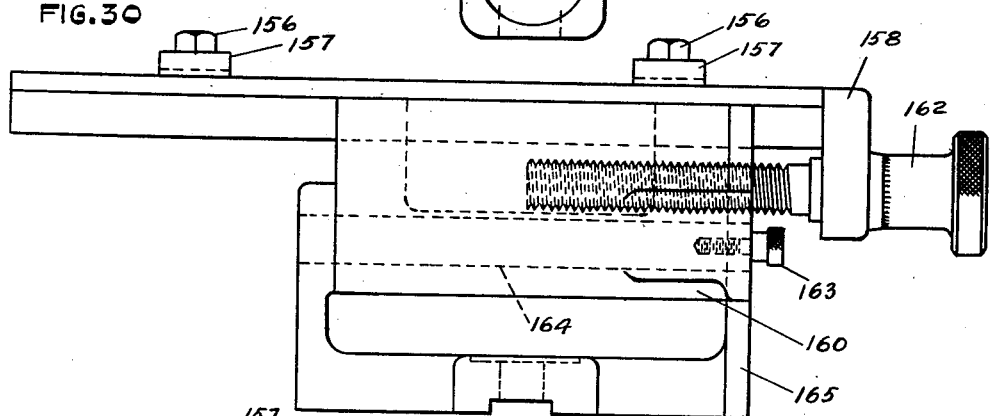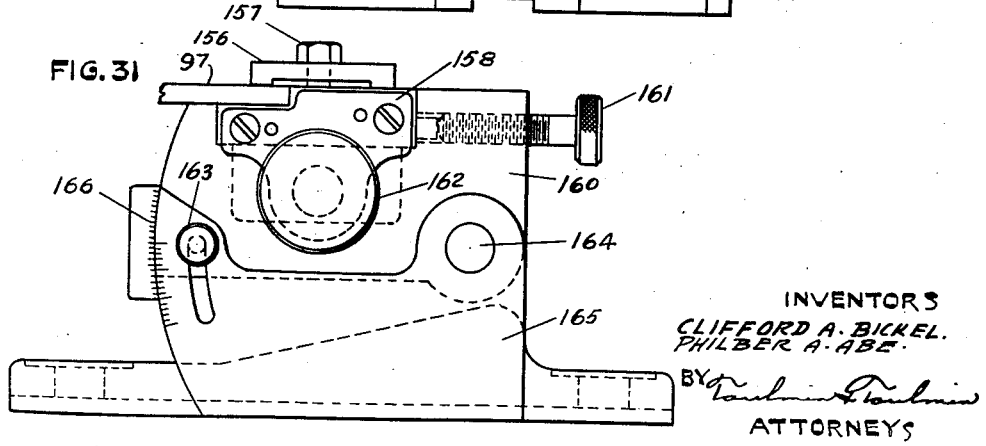

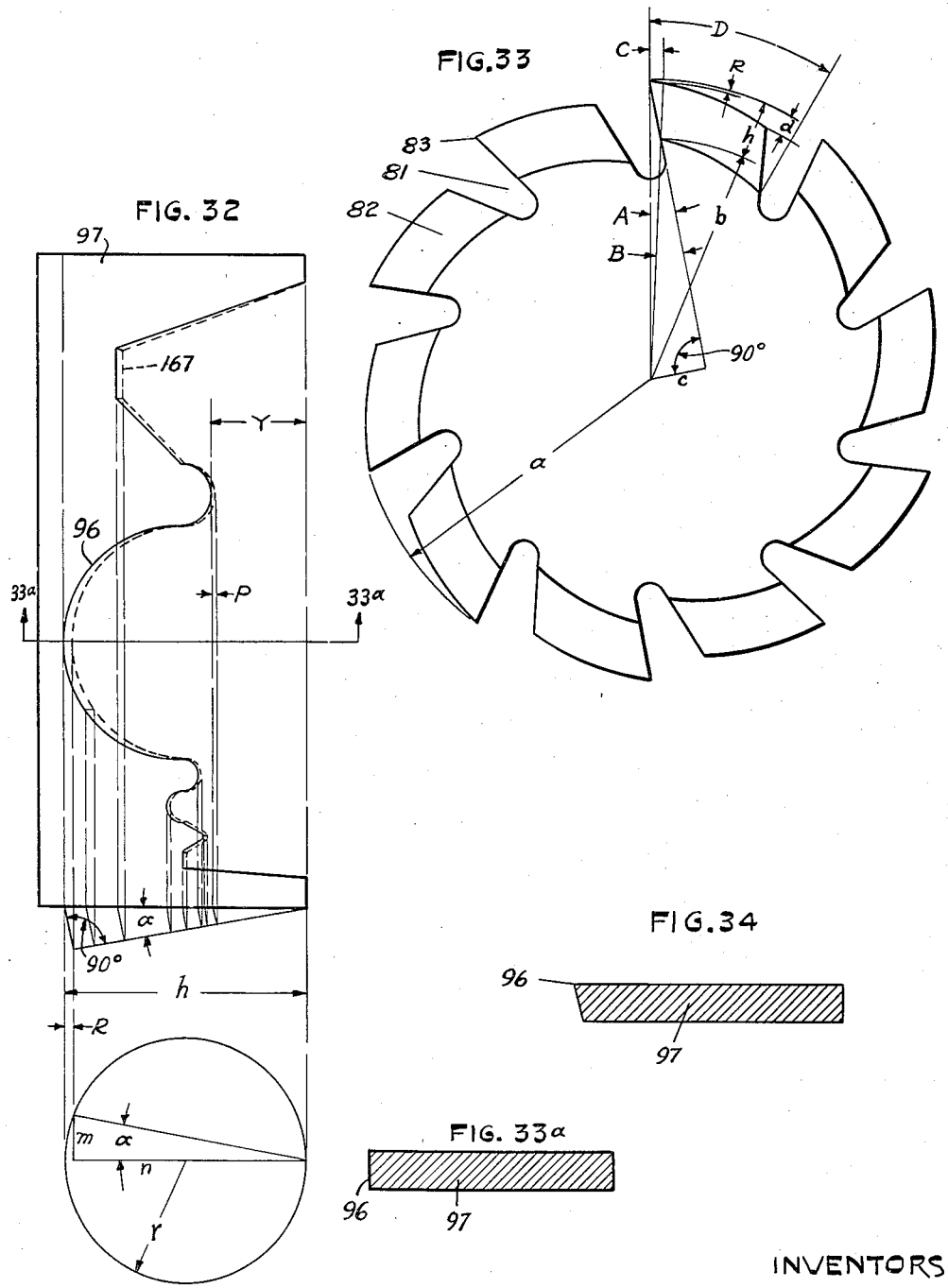

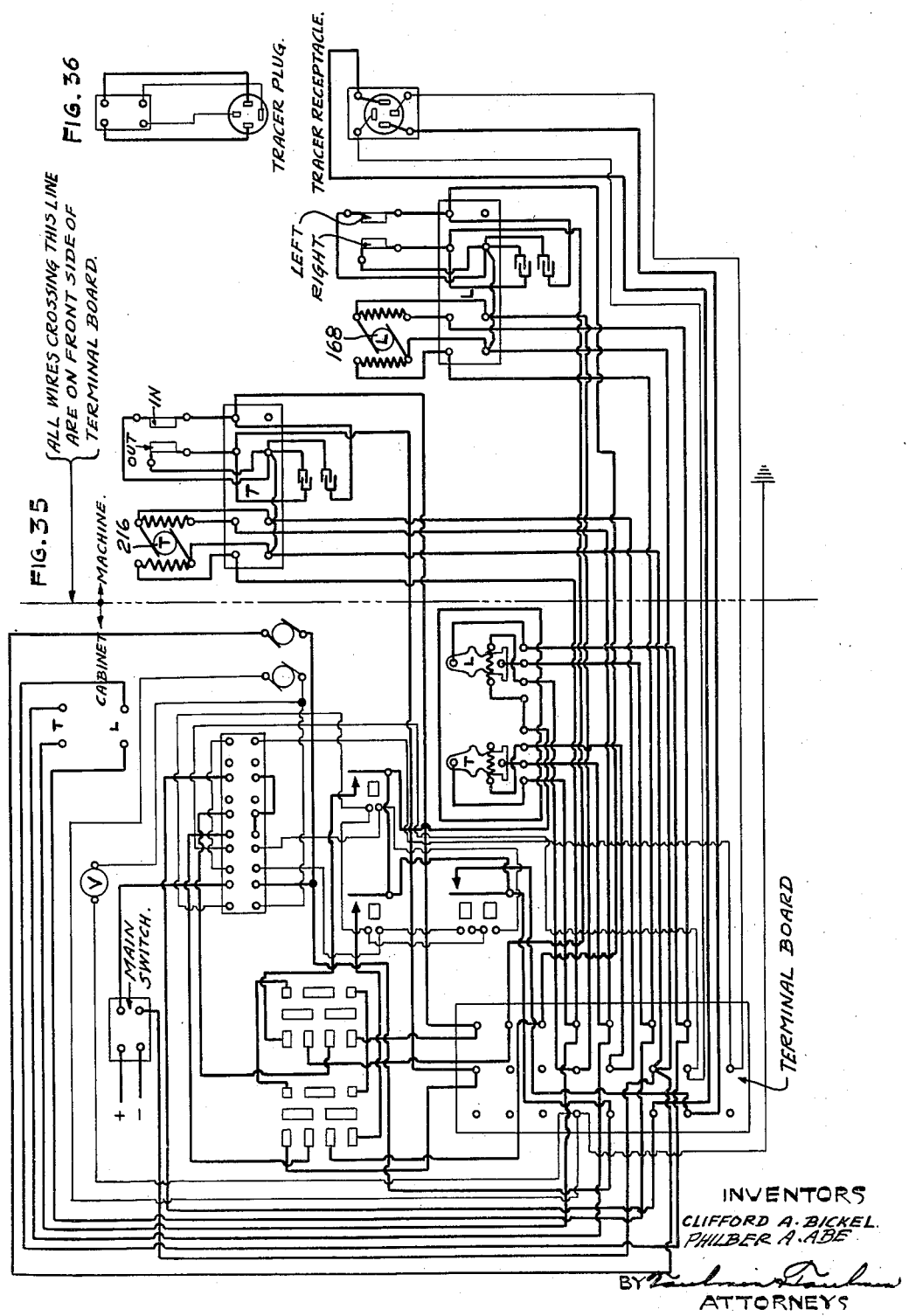

Patented Oct. 3, 1933

1,929,269

UNITED STATES PATENT OFFICE 1,929,269

APPARATUS FOR AUTOMATIC FORM TURNING LATHES

Clifford A. Bickel and Philber A. Abe, Sidney, Ohio, assignors to The Monarch Machine Tool Company, Sidney, Ohio, a corporation of Ohio Application December 28, 1931
Serial No. 583,570

96 Claims. (Cl. 82—19)

Our invention relates to an apparatus and method of operation for automatic form turning lathes.

It is the object of our invention to provide an automatic relieving machine and method of operation thereof and method of forming work pieces of various sizes and forms, and particularly forming relieved milling cutters.

It is the object of our invention to provide such a machine in which the movement of the tool in imparting the configuration to the work piece by the longitudinal and transverse movements of the tool will be automatically, electrically controlled by the engagement and relative movement of a former pin with respect to a template so that the movement of the former pin will make and break electrical contacts which will, in turn, control the longitudinal and transverse movements of the tool with respect to the work.

It is a further object to provide for the continuous spiral cut of the tool with respect to the work without the removal of the tool from the work except as it may be necessary, in the case of forming milling cutters with hooked teeth, to readjust the position of the tool and to compensate its position due to the change in angularity of the gash in the work piece and change in diameter thereof.

It is a further object to provide means of continuously and uniformly operating the work piece on the spindle at a uniform speed while automatically in synchronism therewith adjusting the point of application of the tool as the tool progresses longitudinally of the work piece so that the tool will always, upon its return to the work piece, be applied to the leading edge of the tooth being cut, while, at the same time, the path of cutting from beginning to end of the work piece will be substantially spiral and otherwise continuous, as it is possible by the very delicate and minute adjustment of the electrical controls to maintain the tool in substantially continuous contact with a movement of not over a thousandth of an inch with the work piece so that a spiral cut can be attained, while, heretofore, the best that could be accomplished in the art was a series of substantially parallel, continuous, circular cuts.

It is a further object to provide a mechanism and method by which, when the pin once engages with the former, it will remain in engagement with the former continuously until the work is completed.

It is a further object to provide means by which, when a hooked tooth work piece is being relieved, to either use a corrected template or a tilted template. In the event the corrected template is used, which we prefer and which is one of the forms of our invention, the template is not of the precise form of the work piece, but is so corrected that the pin following such a template will control the application of the tool to compensate in an overhanging hooked cutter for the angular loss of position due to the angularity of the gash in the work piece as the tool progresses along the work piece longitudinally so that the tool, when guided by the corrected template, will always apply itself to the leading edge of each tooth no matter what position in the length of the work piece, so that the tool will be immediately applied in cutting position to the leading edge of such tooth irrespective of the change of angularity of the gash which forms one wall of the tooth of the work piece and compensate for the change in diameter.

It is our object to eliminate relative movements between the former and former pin at intervals, which has heretofore been the custom in the art, and to thereby secure a cleaner, more uniform cut and one of very much greater accuracy than has heretofore been possible in form turning and relieving machines.

It is our object to avoid all use of forming tools and to form the work by rough cutting on my machine and then finish cutting but all cutting to be done in accordance with the method and apparatus we set forth in this document.

It is a further object to provide a tracer or former pin slightly larger, usually from ten to eleven thousandths of an inch, than the tool diameter to compensate for the air gap in the electrical contact points in the electrical control switch which controls the magnetic clutches and motors for imparting longitudinal and transverse movement to the tool to cause it to be applied to the work to give the work the desired configuration.

It is our object to eliminate the use of a template of the same form as the work when working on a hooked tooth milling cutter, as the use of such a template leads to inaccuracies and complication in the mechanism, which we can avoid by our mechanism and method of cutting.

It is our object to provide constant spindle speed and synchronous relieving of the tool, the movements of which, while constant in length, are timed as the carriage progresses according to the spiral of the teeth on the cutter.

Referring to the drawings:

Figure 1 is a front elevation of the machine;

Figure 2 is a plan view thereof;

Figure 3 is a diagrammatic view of the tracer pin electrical control;

Figure 4 is a section on the line 4—4 of Figure 2 showing in section the tool bed carriage, tool rest and tool support and the relieving cam actuating mechanism as well as the former pin support and switch support in section;

Figure 4a is a section on the line 4a—4a of Figure 4;

Figure 5 is a skeleton plan view with the former support partially in section, with a part of the gear housings partially in section and the pin sleeve in section showing the mechanism for adjusting the relieving cam movements and therefore the tool movements with respect to the angularity of the gash in the work piece;

Figure 5a is a section on the line 5a—5a of Figure 5;

Figure 6 is a plan view of a typical template;

Figure 7 is a section through the pin sleeve showing the location of the pin that engages in the helix of the shaft that controls the relieving cam movements;

Figure 8 is a rear elevation of the central portion of the machine with particular reference to the former pin and template;

Figure 9 is an end elevation of the right hand end of the machine where the motors and magnetic clutches and driving gearing for the lead screw and the feed rod for the cross feed are located;

Figure 10 is a section on the line 10—10 thereof showing the typical arrangement of the driving motor, gear shaft and magnetic clutch therefor for either the lead screw or cross feed shaft;

Figure 13 is a vertical section on the line 13—13 of Figure 2 showing the connection between the spindle and the pin sleeve constituting the drive shaft for the relieving attachment;

Figure 14 is a detail top plan view of this driving sleeve and the adjacent end of the helical shaft constituting a part of the drive mechanism for the relieving attachment;

Figure 15 is a detail side elevation thereof;

Figure 19 is a section on the line 19—19 thereof;

Figure 20 is a section on the line 20—20 thereof;

Figure 22 is a side elevation of the spindle gear box;

Figure 23 is a section on the line 23—23 thereof;

Figure 26 is a front elevation of the apron partially in section showing the connection between the feed rod, feed rod worm and feed rod worm gear for imparting transverse movement to the cross slide tool support;

Figure 27 is a section on the line 27—27 of Figure 26.

Figure 28 is a section on the line 28—28 of Figure 2 showing the driving connections and clutch arrangements for the work spindle from the power source;

Figure 29 is a top plan view of the template support showing mechanism for tilting the template when that is desired;

Figure 30 is a rear elevation thereof;

Figure 31 is a side elevation thereof;

Figure 32 is a top plan view of the corrected template used in connection with correcting the tool application when relieving a hooked tooth milling cutter;

Figure 11:
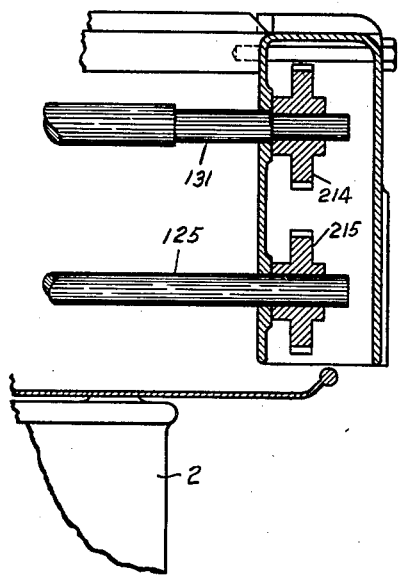
Figure 11 is a section on the line 11—11 of Figure 9.

Figure 33 indicates in side elevation diagrammatically a partially cut hooked tooth milling cutter which has been partially formed and relieved;

Figure 33a is a section on the line 33a—33a of Figure 32;

Figure 34 is a section on the line 34—34 of Figure 6 showing the form of the edge of the template when not using a corrected template in order that the follower pin may have a sharp accurate edge upon which to ride;

Figure 35 is an electrical wiring diagram of the complete electrical control system;

Figure 36 is a wiring diagram.

Referring to the drawings in detail, 1 and 2 indicate the legs of the tool bed 3 having the usual pan 4. 5 indicates the tail stock and 6 the head stock.

*Spindle driving mechanism*

The work piece generally designated 7 is suitably supported on the spindles. The driving spindle 8 being driven as follows, as will be more clearly seen in Figure 28.

The drive sheave is indicated at 9 on which are mounted a plurality of V-shaped belts. This drive sheave is arranged to be clutched by the clutch generally designated 10 to the shaft 11 with suitable actuation of that shaft through the fork engaging in the slotted collar 12. This shaft drives through the conventional gearing, which forms no part of this invention, such as the gears 13 or 14 to the gears 15 or 16 on the intermediate shaft 17 and thence through the gears 18 or 19 to the gears 20 or 21 on the shaft 22 through gears 23 or 24, gears 25, 26 or 27 on the spindle shaft 28. The shaft 28 carries gears 28a and 28b, which engage with the gears 29a and 29b respectively on a shaft 30a. The clutch 29 may engage either gear 29a or gear 29b for rotating the shaft 30a. This clutch rotates with the shaft 30a, but may be moved longitudinally thereof to engage either of the gears 29a or 29b, which are loosely mounted upon the shaft 30a. The clutch member 29 is in neutral position as shown when the relieving attachment and mechanism, as hereinafter described, is in operation. This portion of the conventional lathe is thereby rendered inoperative. The spindle rotation is continuous and constant for any given setting, which is one of the features of my invention, as one of the fundamental prerequisites of it is a constant spindle speed.

*Pin sleeve relieving cam actuating drive*

Referring to Figure 13 in conjunction with Figure 28, the spindle shaft 28 driving gear 29c drives pinion 30 mounted on the eccentric bearing shaft 31. This pinion 30 is an idler which engages in turn with the gear 32 on the shaft 33 which carries the gear 34 that meshes with the pinion 35 on the shaft 36. This shaft 36 may be suitably adjusted through the nut 37 in the guideway 38 as may be desired when adjusting the position of that shaft to different sizes of gears but changing the relative speed ratio between the spindle and the pin sleeve hereinafter described.

On the shaft 36 is mounted a gear 39 meshing with the pinion 40 on the shaft 41. It will be observed that the gears 34, 35, 39 and 40 may be removed and their sizes changed in order to vary the speed desired.

The shaft 41 has mounted on the other end thereof on the other side of the supporting frame 42 a hollow pin sleeve 43 which carries within it a cam pin 44 as will be seen in Figure 7. This cam pin travels within the helical groove 45 of the shaft 46 that controls the movements of the relieving cam.

Relieving cam mechanism

Referring particularly to Figures 4, 5, 5a, 7, 14 and 15, it will be observed that the shaft 46 carries on one end thereof the gear 47 which meshes with an intermediate pinion 48 which, in turn, engages the pinion 49 on the stub shaft 50 which is connected by a universal link 51 to the shaft 52 which carries the gear 53 that engages with the idler pinion 54 which, in turn, drives the pinion 55 on the relieving cam shaft 56 carrying the relieving cam 57. This relieving cam, as will be seen more clearly in Figure 4, engages the hardened end constituting a cam follower 58 which is mounted upon the adjustable slide member 59 that carries the tool support 60. The adjustment between this cam follower carrier or adjustable slide member 59 and the tool support 60 is effected through the screw 61 working in the block 61a on the carrier 59, the end of such screw 61 being supported at 62 in the housing of the tool support. A gear 63 is mounted on the screw and engages an adjusting gear 64 mounted on a micrometer shaft 65 having a micrometer 66 and an actuating head 67. The movement of the cam follower carrier or slide with the tool support by the relieving cam engaging the cam face 68 of the hardened cam follower head 58 is resisted by the spring 69 telescopically arranged within the cam follower carrier and engaged by an adjustable abutment 70 carried on the end of the adjusting screw 71. This screw is adjusted within the carrier 72 and locked in position by the nut 73. The carrier 72 is fixed upon the tool rest 74 that is mounted for rotation on the pin 75 and locked in position by the locking bolts 76 which have their heads located in the grooves 77, which grooves are located in the upper face of the pin support slide 78. Suitable dovetails are provided, as indicated particularly in Figure 4a for relative guiding of the parts one with respect to the other.

The tool itself at 79 is held in position by any suitable locking mechanism 80 as desired.

It will be noted that the work piece is provided with a plurality of helically-arranged, parallel gashes 81 to form the teeth 82. The teeth 82, as will be more clearly seen in Figure 33, overhang the gashes 81. It is this condition which necessitates, as we later describe, the special method and apparatus for relieving milling cutters of this design.

In the present instance, the mechanism now being described is for the purpose of having the tool point always applied to the leading edge 83 at each application of the tool thereto for each cut irrespective of the helical twist of the gashes. Consequently, the helical groove 45 is laid out on the same helical path as the gashes 81 so that, as the tool progresses longitudinally from right to left as the carriage is moved with respect to the work, the relieving cam will be so timed as to apply the point of the tool to the leading edge 83 irrespective of the position of the tool longitudinally of the work.

Follower pin mechanism and switch

Referring to Figure 4, it will be seen that the dovetail plate 78 constituting the pin support slide serves not only to carry the tool rest and tool support but it is also provided with a slotted arm 84, as will be seen more clearly in Figure 5 on which slotted arm is adjustably mounted by the bolt 85 a supporting plate 86 for the tubular follower pin standard 87 that is split at 88 and adapted to be clamped by the bolt 89 and ears 90 around the follower pin sleeve 91. This follower pin sleeve provides within it a transversely-arranged socket seat 92 in which fits a ball 93 for universal movement therein, which ball is formed upon the follower pin 94, the depending end of which at 95 engages the template edge 96 of the template 97.

The upper end of this universally-supported follower pin 94 is provided with a switch actuating end 98 engaging the under side of a switch lever 99 which is pivoted at 100 within its casing 101. A spring 102 yieldingly resists this movement. The free end of the lever is provided with a contact 103 and a contact 104 on the top and bottom of the lever respectively. The contact 103 is adapted to engage with the terminal 105 and the contact 104 is adapted to engage with the terminal 106 or the lever can assume a neutral position between said terminals and out of engagement with both of them. The casing 101 is preferably supported upon the follower pin sleeve 91. Thus, the follower pin as it follows along the template 97 engaging the edge 96 thereof will be so rocked as to position the switch arm 99 in either its uppermost position, its central neutral position, or its lowermost position, thereby effecting the longitudinal or transverse movement of the carriage, as will be hereinafter described, as such electrical contacts control the actuation of the motors which impart, through the lead screw, longitudinal movement, or, through the cross feed shaft, transverse movement of the pin support slide with the accompanying mechanism.

The pin support slide, as will be seen in Figure 4, is provided with a depending screw block 107 which engages with the cross feed screw 108. This block is held on the pin support slide 78 by the supporting bolt 109.

Cross feed actuating mechanism

By referring to Figures 4, 25, 26 and 27, it will be noted that the screw 108 is formed upon the shaft 110 upon which shaft is mounted a pinion 111 that is driven by the cross feed gear 112. This cross feed gear 112 is mounted upon the stub shaft 113 in the face of the apron 114 which, in turn, engages the gear 115 which has an internal clutch face 116 engaging the clutch member 117 that is actuated by the shaft 118 by the clutch handle 119 and is shown in clutched position. This clutch member 117 carries the gear 120 which in turn engages with the gear 121 on the worm shaft 122 carrying the worm gear 123 which meshes with the worm 124 on the feed rod shaft 125. This feed rod shaft is provided with a splined groove to which the worm 124 is splined.

The worm 124 is located between the shoulder blocks 126 on the apron 114 and the thrust thereon is taken by the ball bearings 127.

The actuation of the cross feed rod 125 will be described hereinafter in connection with the electrical control mechanism.

The mechanism controlled by the clutch operating lever 128 is inoperative as indicated by the open condition of its clutch as this is not used while the present mechanism of my invention is being operated on the standard lathe.

The shaft 110 may be operated by hand by the hand wheel 129.

*Tool carriage and longitudinal movement thereof*

The tool carriage 130 having the apron 114 is moved longitudinally by the lead screw 131.

Figure 16:
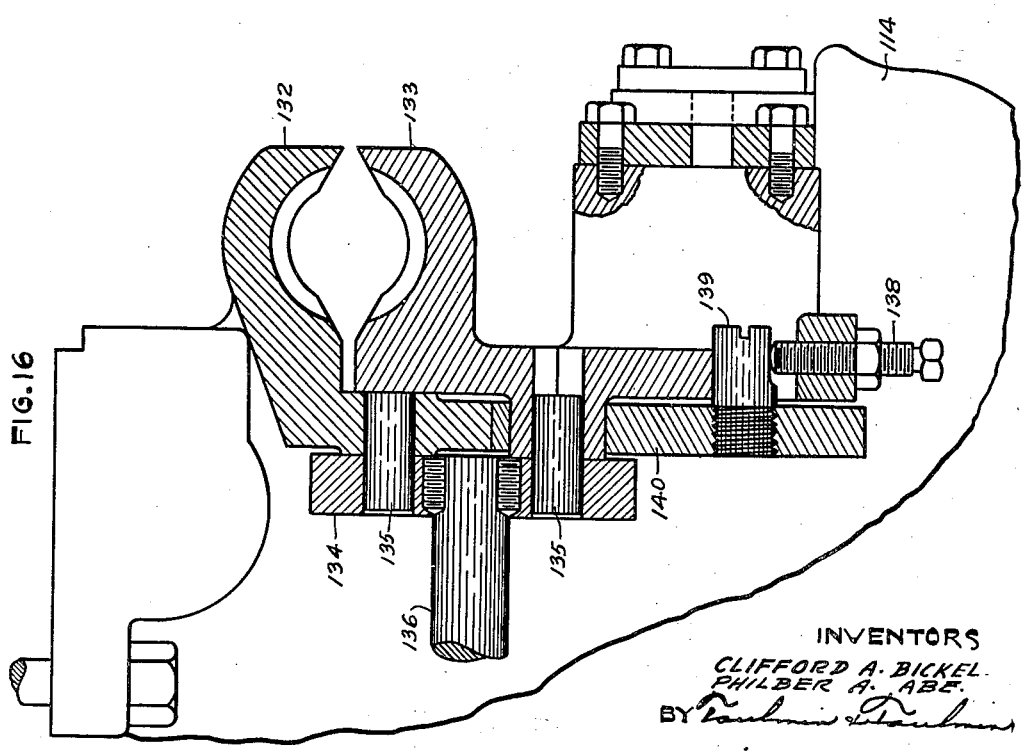
Figure 16 is a detail section on the line 16—16 of Figure 27 showing the clutch arrangement and adjustment for the internally-threaded nut on the apron that engages with the actuating lead screw that imparts longitudinal movement to the carriage.
Figure 18:
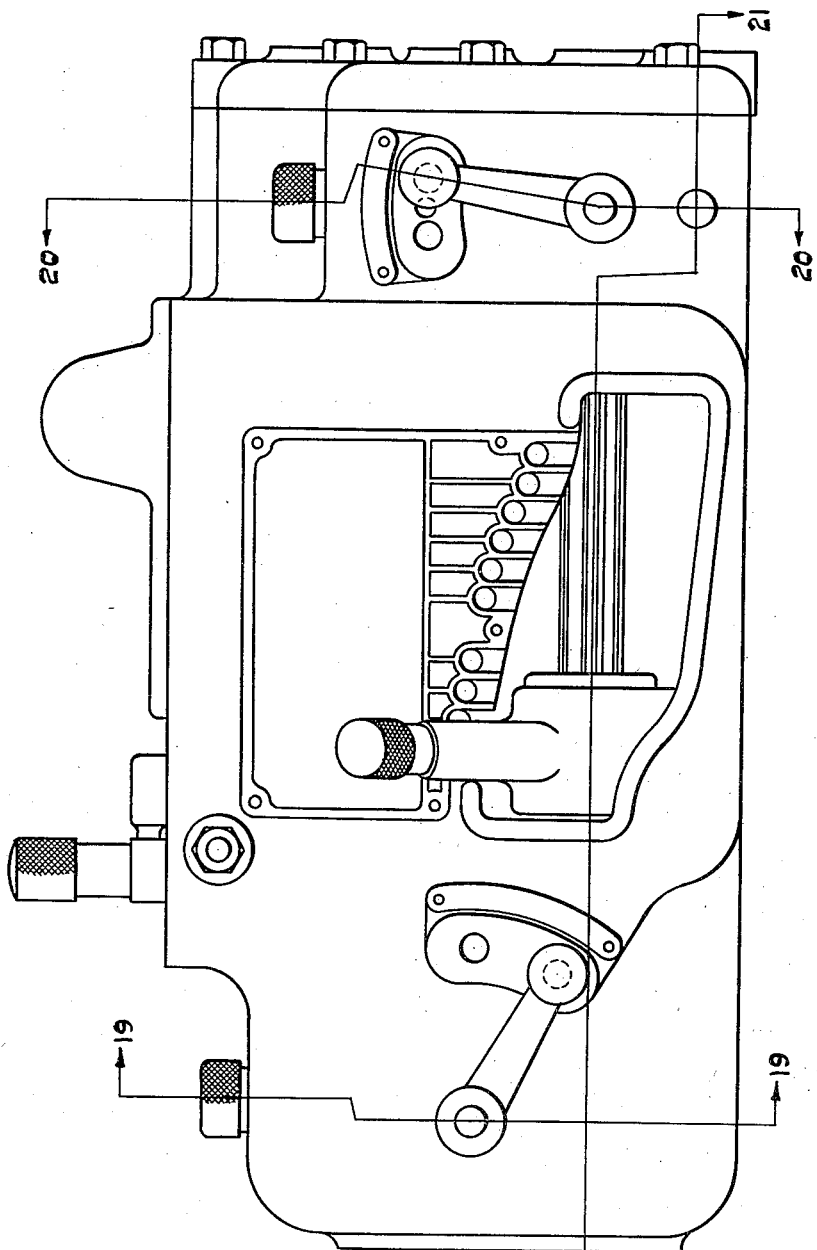
Figure 18 is a side elevation of the change speed gear box.
Figure 21:
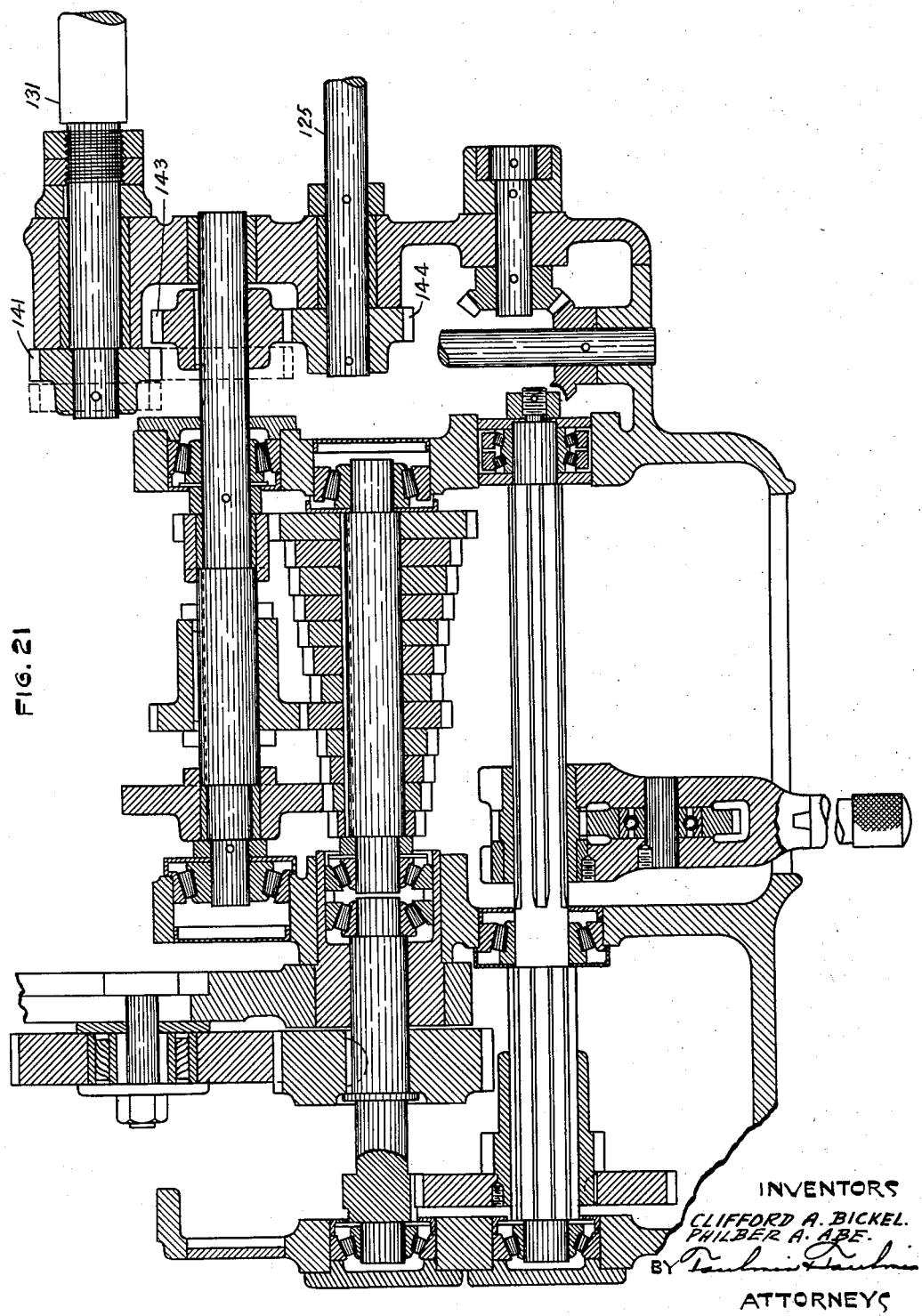
Figure 21 is a section on the line 21—21 thereof.
Figure 24:
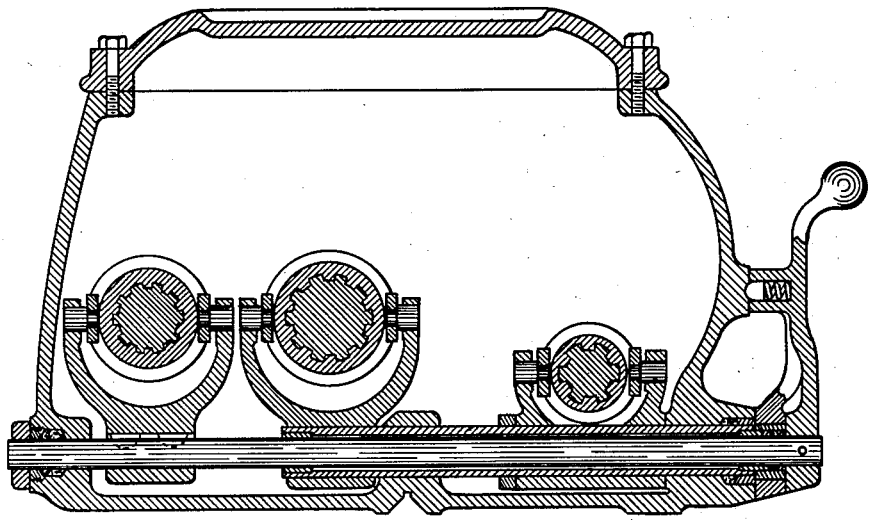
Figure 24 is a section on the line 24—24 thereof.
Figure 25:
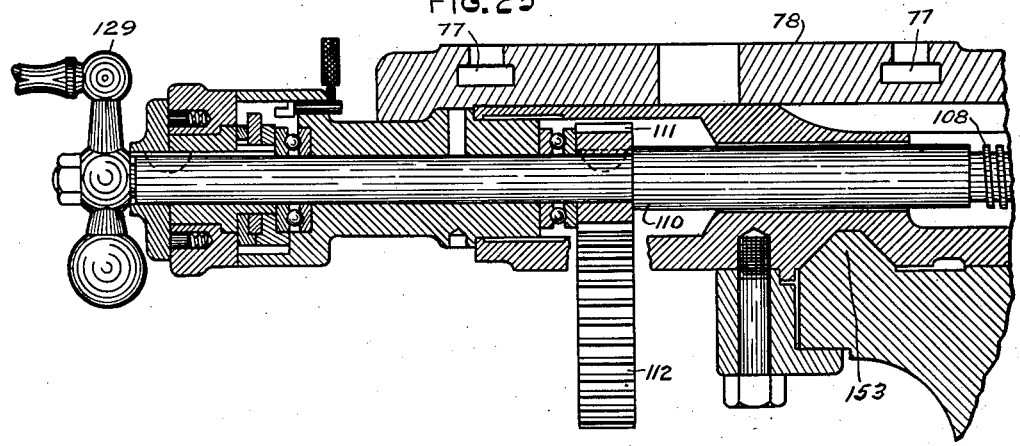
Figure 25 is a section on the line 25—25 of Figure 26 showing the cross feed driving mechanism as applied to the tool support.

As will be seen in Figures 4, 16 and 27, this lead screw engages with the upper and lower halves 132 and 133 of the screw block which is mounted upon the apron 114. The halves of this screw block are clamped upon the screw by the use of the cam plate 134 and the cam pins 135 actuated by the shaft 136 and the lever 137. The lever 137 is a feed control lever. The adjustment of this movement of clamping the halves of the block 132 and 133 may be further effected by the adjustment of the screw 138 against the stud 139 carried by the apron 140 of the upper block 132. The lead screw is actuated, as will be hereinafter described, from the right hand end of the machine when using the mechanism of this invention on a standard lathe. As will be seen in Figure 21, when the mechanism of this invention is in operation, the standard lathe change speed gear mechanism illustrated in Figures 19, 20 and 21 is rendered inoperative. The gear 141, which normally operates the lead screw 131 inside the change speed gear box 142, assumes the position shown in dotted lines. The gear 143 may be shifted along the shaft 143a by the arm 143b, and the gear 141 may be reversed on the shaft 131 by removing it and placing it back thereon. Its cooperating gear 143 assumes the position shown in dotted lines and the feed shaft rod 125 is no longer operated by the gear 144. These views of the change speed gear mechanism are shown for the purpose of illustrating the simple changes necessary on a standard lathe for the application of our invention, which is one of its features of advantage, in that the standard lathe may be utilized and it is not necessary to provide a specially built lathe for the application of our mechanism and the practice of the method of forming articles with irregular shapes.

The hand wheel 145 can be utilized with the shaft 146, gears 147 and 148, shaft 149 and gear 150 to move the carriage by hand when desired. This gear engages with the rack 151. The lever 152 is a conventional lever for controlling the main drive clutch.

The carriage 130 is mounted upon the guides 153 of the tool bed in the usual manner.

*Template construction*

We can employ in our machine two types of templates. The one type, such as the template 97 shown in Figure 6 is of the same form and size as the piece which is to be cut to that size eventually. In order to give a sharp accurate edge for the follower pin upon which to travel, the edge is arranged as will be seen in the section in Figure 34.

Such a template may be corrected when relieving formed milling cutters having overhanging or hooked teeth, as shown in Figure 33, by tilting the template by the mechanism shown in Figures 29, 30 and 31.

A bracket 154 is bolted at 155 on the rear face of the tool bed. This bracket is provided with a pair of clamps 156 which are retained in position by the bolts 157. These clamps are mounted upon a sliding supporting block 158 which is slidably mounted on the block 160. The degree of lateral movement of this block is determined by the set screw 161 and the longitudinal adjustment is determined by the micrometer adjusting screw 162. A further tilting adjustment is secured through the micrometer adjusting screw 163 which adjusts the position of the block 160 about the pivot 164 on the bed plate 165. A micrometer scale 166 is employed for this purpose.

The other, and preferred, as well as novel, feature of our invention is the use of a template, such as shown in Figure 32 and the section in Figure 33a, which has been corrected by reducing the face 96 to that indicated by the dotted line 167 which indicates the amount of correction necessary to the face of the template to insure the application of the point of the tool to the leading edge 83 of the overhanging toothed cutter which is being cut despite the angularity of the helical gash 81 which divides the teeth throughout the longitudinal length thereof and to compensate for the difference in diameter of the work.

In order to relieve a work piece with such teeth and to bring the relief in proper relation with the helical teeth, it is necessary to retard or advance the relieving movement of the tool depending upon whether the flutes are right or left hand. While we have already described our method of compensating for the variation of the relationship of the relieving tool to the relationship of the helical teeth by using the splined helical groove shaft 45, yet, when hooked teeth are provided, as are now under consideration, on the work piece, which have their front cutting faces inclined with respect to radial lines passing through the work piece, if the form produced is to remain exactly the same as that of the template or the corrected form of the template, the form of the relieved surfaces must change as the diameter of the cutter changes. To do this, the tool is adjusted in its movement either by setting the template at the same angle as the undercut tooth surfaces of the cutter, as heretofore described, or by correcting the shape of the template the required amount as we are now describing.

To determine the amount of correction, we find that, as the tool moves in a straight radial line towards the center of the cutter a given distance and returns to its starting position once during the revolution of the cutter through each tooth space, it will be seen that the working depth of the template will be less than the working depth of the cutter due to the movement of the tool and the angularity of the face. If it be assumed, as indicated in Figures 32 and 33, that R equals the outside radius of the cutter, $r$ equals the inside radius of the cutter R—C; that C equals the depth of the tooth; A is the distance of the cutting edge behind the center; $a$ equals R sin $(b)$; $b$ is the angle of the cutter rake $$\sin A = \frac{a}{R};$$

N is the number of teeth in the cutter; and D is a drop of the backing off cam; we find that it is good practice to use a ⅞ inch tooth pitch for forward movement to the tool or $$\frac{315}{N}$$

equals the angular movement of the cutter when the tool moves forward. The tool starts to cut on the line OE but does not cut its entire form until the cutter is revolved through an angle (F) on the plane (OG) and, at this time, the tool is moved towards the cutter a difference represented by H. Therefore, the template must have a working depth equal to I or C—H. Therefore:

$$\sin J = \frac{R \sin B}{Y}$$

$$F = J - B$$

$$H = \frac{NDF}{315}$$

$$I = C - H$$

Or, stated in another way, we have the known quantities, such as:

a = Large diameter.
 b = Small diameter.
 A = Under cut angle.
 F = Number of flutes.
 d = Relief.

And we desire to find the following:

$$\text{Side } C = ax \sin A$$

$$\text{Sine } B = \frac{c}{b}$$

$$\text{Angle } C = B - A$$

$$\text{Angle } D = \frac{315}{F}$$

$$\text{Drop } R = \frac{c \times d}{D}$$

$$\text{Radius } r = \frac{h}{2}$$

$$\text{Cord } m = \sqrt{R(2r - R)}$$

$$\text{Side } n = h - R$$

$$\text{Tan } X = \frac{m}{n}$$

$$\text{Drop } P = \frac{R \times Y}{h}$$

Thus, we correct the cutter from its normal face 96 to its corrected face 167 that distance represented between the arrows R or a distance sufficient to compensate for the angle between the arrows C.

*Drive mechanism for lead screw and cross feed shaft*

Figure 10A:
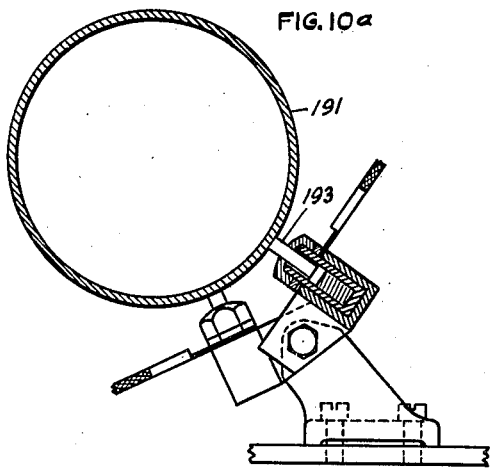
Figure 10a is a detail side elevation of the application of the brushes to the magnetic clutch.
Figure 12:
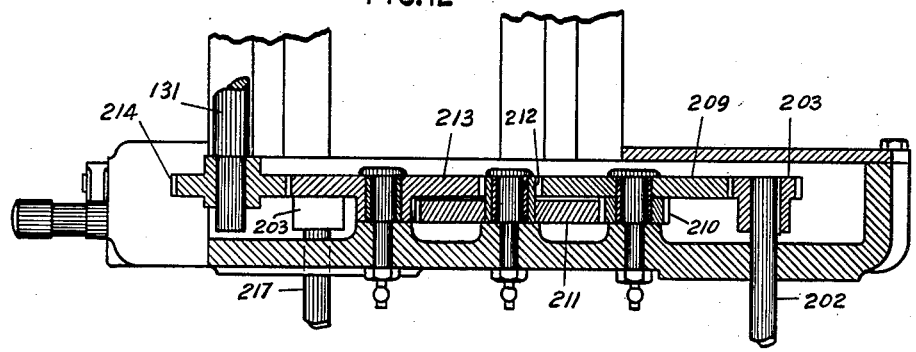
Figure 12 is a section on the line 12—12 of Figure 9.

Referring to Figures 9, 10, 11 and 12, it will be noted that the average lead screw and splined shaft is provided with a drive mechanism, such as shown in Figure 10, consisting of the following:

An electric motor 168, the starting and stopping of which motor is controlled by the electrical contact mechanism that is opened and closed through the movement of the former pin 94. The operation of this circuit will be described hereinafter. When the motor 168 starts up, it may drive through either gear 169 or 170 mounted on its armature shaft 171, which gears are slidably carried thereon through the sleeve 172 and are set in position by the knurled setting member 173.

Consequently, either gear 169 engages with gear 174 or gear 170 engages with gear 175. Gears 174 and 175 are connected together by the bolts 176 and are carried upon the shaft 177. This shaft in turn has a sleeve 178 carrying gears 179 and 180 which may be shifted into engagement with their respective gears through the shifting shaft 181 and head 182. Gear 179 may engage gear 183, or gear 180 may engage gear 184. The last mentioned gears are both mounted upon a common shaft 185 which carries a pinion 186 meshing with an idler gear 187 that in turn engages the gear 188 mounted on the shaft 189 supported in the bracket 190 of the end housing of the machine. This shaft 189 carries a magnetic clutch having contact strips 191 and 192 engaged by the brushes 193 and 194. The magnetic clutch is provided with a magnetic field 195 having a magnetic face 196 adjacent the clutch plate 197 mounted on the sleeve 198 that carries the pinion 199.

A helical spring 200 interconnects through the hollow shaft 198 yieldingly the oppositely-disposed clutch members marked C1 and C2 respectively.

If clutch C2 is energized, the drive will be through gear 187, gear 188, pinion 199, gear 201, shaft 202 and pinion 203.

If clutch C1 is energized so as to connect its gear 204 through the clutch plate 196 to shaft 198, then the drive will be from shaft 185 through the pinion 205, pinion 206, shaft 207 and pinion 208. By employing these two magnetic clutches, the direction of drive can be controlled by the opening and closing of the circuit controlling the clutches.

Assuming that gear 203 is to drive the lead screw for longitudinal movement of the carriage, it will be observed that gear 203 drives gear 209 which carries pinion 210 meshing with gear 211 which carries pinion 212 and meshes with gear 213 that in turn drives the pinion 214 mounted on the lead screw 131.

If the gear 203 is used to drive the feed rod or feed shaft for the cross feed, then it drives directly the gear 215 mounted on the cross feed shaft 125.

For the purpose of identification, we have designated the motor driving the shaft 125 as motor 216, but it corresponds in all other respects to motor 168. We have designated its final drive shaft carrying the gear 203 as 217.

*Master control cabinet*

This control cabinet contains the incoming circuits, the relays, a converter for reducing 110 volt current to 14 volt current, which is the voltage required by the tracer mechanism, and the requisite switches and rheostats.

The button 218 has a rheostat controlling through a twelve-point speed control the longitudinal feed speed. The button 219 controls likewise the transverse cross feed speed. The handle 220 is used to shift as a reversing switch so as to select motors 168 or 216 as the motor is to be used primarily for longitudinal or transverse feed. For instance, motor 216 is normally the motor for the transverse drive of the cross feed, as in a job of turning a piece of work, while motor 168 is the longitudinal motor, but in a facing job, such a motor will have the minor work to do, while motor 216 will have the primary work to do.

Therefore, for convenience, we provide the handle 220 of the switch so as to select the motor for the operation desired.

Referring to the switch buttons on the panel 221 button 222 cuts off the tracer circuit and button 223 closes the tracer circuit. Button 224 opens the directional switch and button 225 closes it. This switch is a safety feature. Buttons 226 and 227 are directional buttons which are set to give the proper directional movement. Buttons 228 and 229 control the switch for giving respectively external and internal movements as, for instance, outside turning movement or boring movement. Buttons 230 and 231 serve to control a main switch that stops or starts all motors. Buttons 232 and 233 respectively open and close the switch to the main motor driving the spindle.

*Complete electrical circuit diagram*

Referring to Figures 35 and 36, T refers to transverse movement and L to longitudinal movement.

Figure 17:
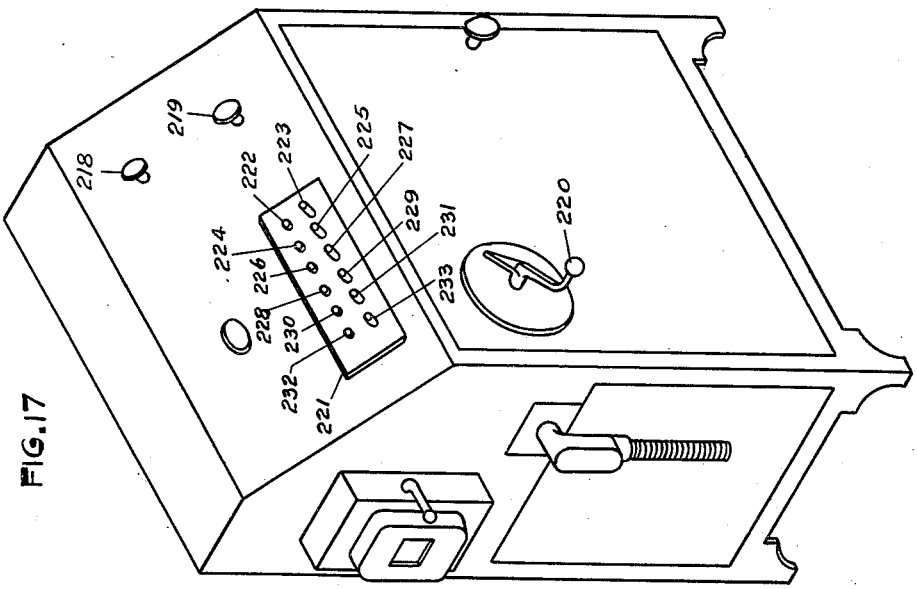
Figure 17 is an isometric perspective of the control box for setting the electrical controls.

The light lines indicate a 14-volt circuit and the heavy lines 110-volt circuit. The wires on the left hand of the vertical dot and dash lines are in the control cabinet shown in Figure 17, while the equipment and wiring on the right hand side of the vertical dot and dash lines is on the machine tool proper.

Figure 36 shows the automatic presser circuit.

*Method of operation*

To summarize the method of operation, the work piece, which is driven through the spindle by the main motor, is turning at a constant speed and continues to do so throughout the operation.

The pin sleeve 43 is synchronously driven with the work piece and serves as the actuating source for actuating the relieving cam 57 that determines the application of the tool to the work at the proper interval to always engage the leading edge as the helical groove 45 is laid out on the same helix as that of the gash that separates each tooth of the work piece.

As the helix between the teeth varies, so does the helix 45 vary, and, as the carriage is moved by the lead screw to the left, the shaft 46 is telescopically moved within the sleeve 43 and the movements of the cam 57 are correspondingly adjusted.

While this is taking place, the longitudinal movement of the carriage carries the tool with respect to the work so that the tool will describe a generally spiral path around the work; and this is true irrespective of the in and out movements of the tool bodily with respect to the work. While the tool is in engagement with the work, the proper configuration will be determined by the cross feed actuated through the cross feed shaft and its motor.

These two movements of longitudinal and cross feed transverse direction are imparted through the motors 168 and 216 which are controlled in turn through the making and breaking of the contacts 105, 103, 104 and 106 or the neutral position of the contacts 103 and 104 is actuated by the follower pin.

For instance, assuming that the work piece is of the general dimension and size indicated in the drawings and the switch 220 is set for a major longitudinal movement, then the contact 105 will be the feeding-in contact. The contact 106 will be the feeding-out contact, and, when the lever 99 is in neutral position so that neither contact 103 or 104 is in engagement with 105 or 106, then there will be a feeding-forward movement. In other words, if the switch is so thrown at 220 that the major movement will be forward, then the neutral position will be forward when the lever 99 is in its neutral position, but such forward feeding will be interrupted for a feeding in if the follower pin in engagement with the template 97 causes a closing of the contacts 103 and 105, whereas there will be a feeding-out movement if the contacts 104 and 106 are closed. In this manner, the carriage and with it the tool, is caused to describe such a path as defined by the template 97 and as the tool with the carriage progresses longitudinally the tool will be applied intermittently while still maintaining its spiral path in constant engagement with the work when it is applied to the work, such intermittent feeding being due to the relieving cam movement which is timed with each longitudinal position according to the helix of the gash of the work and the helix of corresponding amount on the shaft 46 as at 45.

If the switch 220 is reversed so that the major work is to be a transverse movement, then the neutral position of the switch arm 99 will cause a transverse movement of the tool as the normal movement, while the contacts 103 and 105 and 104 and 106 will operate respectively for longitudinal forward and longitudinal back movement.

The reason for this reversal is that it is more economical in operation and quicker if the major portion of the movements are to be longitudinal to have the setting first mentioned, but, if the major portion of the movements are to be transverse, then the last mentioned setting will be selected. The operation of the machine functionally otherwise is the same.

It will be understood that we desire to comprehend within our invention such modifications as may be necessary to adapt it to varying conditions and uses.

Having thus fully described our invention, what we claim as new and desire to secure by Letters Patent, is:

1. In a forming machine, a constant speed spindle for driving a spiral toothed work piece, a cutting tool, means to reciprocate the tool a uniform distance to and from the work piece, means to move the tool bodily longitudinally and transversely of the work, means to vary the time of movement of the tool as the tool moves longitudinally of the work piece, a corrected template, a rocking follower pin therefor, and means controlled by the rocking of the pin while the pin follows the template to regulate the means moving the tool bodily longitudinally and horizontally of the work.

2. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, and means controlled by the rocking of the pin while the pin follows the template to regulate the means moving the tool bodily longitudinally and horizontally of the work, and means to compensate the tool application to the work according to the work piece diameter as said diameter varies longitudinally of the work piece and the fluted spiral teeth so vary in the diameter.

3. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, and means controlled by the rocking of the pin while the pin follows the template to regulate the means moving the tool bodily longitudinally and horizontally of the work, and means to compensate the tool application to the work according to the work piece diameter as said diameter varies longitudinally of the work piece and the fluted spiral teeth so vary in the diameter, said compensating means comprising a corrected template.

4. In combination, means for rotating a work piece, means of supporting and applying a cutting tool, means to reciprocate the tool a uniform distance to and from the workpiece, means for actuating said tool longitudinally and transversely with respect to said work piece, an adjustable template and a rocking follower pin, means controlled by the relative movement thereof to impart longitudinal or transverse movement to the tool, whereby said follower pin will follow the contour of the template and the tool will cut the work piece to the form of the template, and means to operate said work piece at a continuously uniform speed.

5. In combination, means for supporting and rotating a work piece, means for supporting and applying a tool to the work piece, means to reciprocate the tool a uniform distance to and from the workpiece, a tiltable template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, and means to operate said work piece at a continuously uniform speed.

6. In combination, means for rotating a work piece, means for supportitng and applying a tool to the work piece and a tool so applied, means to reciprocate the tool a uniform distance to and from the workpiece, a tiltable template, a movable follower pin engaging therewith, and means controlled by the movement of the follower pin to move the tool and the follower pin simultaneously together as a unit longitudinally and transversely to cause the pin to follow the contour of the template and the tool to cut the work piece into a form similar to the outline of the template, and means to operate said work piece at a continuously uniform speed.

7. In combination, means for rotating a work piece, means for supporting and applying a tool to the work piece, a cutting tool so supported and applied, a corrected template, means to reciprocate the tool a uniform distance to and from the workpiece, a rocking follower pin engaging said template and supported for movement with the tool, means controlled by the rocking movement of the follower pin as it is rocked by engagement with the template or disengagement therefrom to actuate said tool and follower pin longitudinally and transversely to maintain said follower pin and in engagement continuously with the template and the tool in engagement continuously with the work piece, whereby the tool cuts an outline on the work piece similar to the outline of the template, and means to operate said work piece at a continuously uniform speed.

8. In combination, means for supporting and rotating a work piece, means for supporting and applying a tool thereto and a tool so applied and supported, means to reciprocate the tool a uniform distance to and from the workpiece, a template, a follower pin in continuous engagement therewith, means to support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, and means to operate said work piece at a continuously uniform speed.

9. In combination, means for rotating a work piece, means for supporting and applying a tool to the work piece, a tool therefor, means to reciprocate the tool a uniform distance to and from the workpiece, a template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore and aft of the template and work piece when in the respective extreme positions of the follower pin, and means to operate said work piece at a continuously uniform speed.

10. In a forming machine, a constant speed spindle for driving a spiral toothed work piece, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, and means to operate said work piece at a continuously uniform speed.

11. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, and means to operate said work piece at a continuously uniform speed.

12. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, and means to operate work piece at a continuously uniform speed.

13. In combination, means for rotating a work piece, means of supporting and applying a cutting tool, means for actuating said tool longitudinally and transversely with respect to said work piece, a tiltable template and a rocking follower pin, means controlled by the relative movement thereof to impart longitudinal or transverse movement to the tool, whereby said follower pin will follow the contour of the template and the tool will cut the work piece to the form of the template, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

14. In combination, means for supporting and rotating a work piece, means for supporting and applying a tool to the work piece, a template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

15. In combination, means for rotating a work piece, means for supporting and applying a tool to the work piece and a tool so applied, a template, a movable follower pin engaging therewith, means controlled by the movement of the follower pin to move the tool and the follower pin simultaneously together as a unit longitudinally and transversely to cause the pin to follow the contour of the template and the tool to cut the work piece into a form similar to the outline of the template, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

16. In combination, means for rotating a work piece, means for supporting and applying a tool to the work piece, a cutting tool so supported and applied, a template, a rocking follower pin engaging said template and supported for movement with the tool, means controlled by the rocking movement of the follower pin as it is rocked by engagement with the template or disengagement therefrom to actuate said tool and follower pin longitudinally and transversely to maintain said follower pin and in engagement continuously with the template and the tool in engagement continuously with the work piece, whereby the tool cuts an outline on the work piece similar to the outline of the template, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

17. In combination, means for supporting and rotating a work piece, means for supporting and applying a tool thereto and a tool so applied and supported, a template, a follower pin in continuous engagement therewith, means to so support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

18. In combination, means for rotating a work piece, means for supporting and applying a tool to the work piece, a tool therefor, a template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore and aft of the template and work piece when in the respective extreme positions of the follower pin, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

19. In a forming machine, a constant speed spindle for driving a spiral toothed work piece, a cutting tool, means operatively connected to the spindle to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

20. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, and means controlled by the rocking of the pin while the pin follows the template to regulate the means moving the tool bodily longitudinally and horizontally of the work, and means to compensate the tool application to the work according to the work piece diameter as said diameter varies longitudinally of the work piece and the fluted spiral teeth so vary in the diameter, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

21. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth.

22. In combination, a spindle for rotating a work piece, means of supporting and applying a cutting tool, means for actuating said tool longitudinally and transversely with respect to said work piece, a template, a rocking follower pin, and means controlled by the relative movement thereof to impart longitudinal or transverse movement to the tool, whereby said follower pin will follow the contour of the template and the tool will cut the work piece to the form of the template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means connected to the spindle for synchronizing the continuous spindle speed and the work speed with the relieving movement of the tool in order to apply the tool to the leading edge of the helical teeth as the tool progresses longitudinally of the work piece.

23. In combination, a spindle for supporting and rotating a work piece, means for supporting and applying a tool to the work piece, a template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means connected to the spindle for synchronizing the continuous spindle speed and the work speed with the relieving movement of the tool in order to apply the tool to the leading edge of the helical teeth as the tool progresses longitudinally of the work piece.

24. In combination, a spindle for rotating a work piece, means for supporting and applying a tool to the work piece and a tool so applied, a template, a movable follower pin engaging therewith, means controlled by the movement of the follower pin to move the tool and the follower pin simultaneously together as a unit longitudinally and transversely to cause the pin to follow the contour of the template and the tool to cut the work piece into a form similar to the outline of the template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means connected to the spindle for synchronizing the continuous spindle speed and the work speed with the relieving movement of the tool in order to apply the tool to the leading edge of the helical teeth as the tool progresses longitudinally of the work piece.

25. In combination, a spindle for rotating a work piece, means for supporting and applying a tool to the work piece, a cutting tool so supported and applied, a template, a rocking follower pin engaging said template and supported for movement with the tool, means controlled by the rocking movement of the follower pin as it is rocked by engagement with the template or disengagement therefrom to actuate said tool and follower pin longitudinally and transversely to maintain said follower pin and in engagement continuously with the template and the tool in engagement continuously with the work piece, whereby the tool cuts an outline on the work piece similar to the outline of the template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means operated by the spindle for synchronizing the continuous spindle speed and the work speed with the relieving movement of the tool in order to apply the tool to the leading edge of the helical teeth as the tool progresses longitudinally of the work piece.

26. In combination, a spindle for supporting and rotating a work piece, means for supporting and applying a tool thereto and a tool so applied and supported, a template, a follower pin in continuous engagement therewith, means to so support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means operated by the spindle for synchronizing the continuous spindle speed and the work speed with the relieving movement of the tool in order to apply the tool to the leading edge of the helical teeth as the tool progresses longitudinally of the work piece.

27. In combination, a spindle for rotating a work piece, means for supporting and applying a tool to the work piece, a tool therefor, a template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore and aft of the template and work piece when in the respective extreme positions of the follower pin, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means operated by the spindle for synchronizing the continuous spindle speed and the work speed with the relieving movement of the tool in order to apply the tool to the leading edge of the helical teeth as the tool progresses longitudinally of the work piece.

28. In a forming machine, a constant speed spindle for driving a spiral toothed work piece, a cutting tool, means operated by the spindle to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means for synchronizing the continuous spindle speed and the work speed with the relieving movement of the tool in order to apply the tool to the leading edge of the helical teeth as the tool progresses longitudinally of the work piece.

29. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means for synchronizing the continuous spindle speed and the work speed with the relieving movement of the tool in order to apply the tool to the leading edge of the helical teeth as the tool progresses longitudinally of the work piece.

30. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, and means for synchronizing the continuous spindle speed and the work speed with the relieving movement of the tool in order to apply the tool to the leading edge of the helical teeth as the tool progresses longitudinally of the work piece.

31. In combination, means for rotating a work piece, means of supporting and applying a cutting tool, means for actuating said tool longitudinally and transversely with respect to said work piece, a template and a rocking follower pin, means controlled by the relative movement thereof to impart longitudinal or transverse movement to the tool, whereby said follower pin will follow the contour of the template and the tool will cut the work piece to the form of the template, said work piece having spiral gashes forming teeth therein, said teeth overhanging with their cutting faces at an angle to the radii passing through the work piece center, and means of correcting the template to compensate for the angularity of the helical gashes in the work piece.

32. In combination, means for supporting and rotating a work piece, means for supporting and applying a tool to the work piece, a template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, said work piece having spiral gashes forming teeth therein, said teeth overhanging with their cutting faces at an angle to the radii passing through the work piece center, and means of correcting the template to compensate for the angularity of the helical gashes in the work piece.

33. In combination, means for rotating a work piece, means for supporting and applying a tool to the work piece and a tool so applied, a template, a movable follower pin engaging therewith, means controlled by the movement of the follower pin to move the tool and the follower pin simultaneously together as a unit longitudinally and transversely to cause the pin to follow the contour of the template and the tool to cut the work piece into a form similar to the outline of the template, said work piece having spiral gashes forming teeth therein, said teeth overhanging with their cutting faces at an angle to the radii passing through the work piece center, and means of correcting the template to compensate for the angularity of the helical gashes in the work piece.

34. In combination, means for rotating a work piece, means for supporting and applying a tool to the work piece, a cutting tool so supported and applied, a template, a rocking follower pin engaging said template and supported for movement with the tool, means controlled by the rocking movement of the follower pin as it is rocked by engagement with the template or disengagement therefrom to actuate said tool and follower pin longitudinally and transversely to maintain said follower pin and in engagement continuously with the template and the tool in engagement continuously with the work piece, whereby the tool cuts an outline on the work piece similar to the outline of the template, said work piece having spiral gashes forming teeth therein, said teeth overhanging with their cutting faces at an angle to the radii passing through the work piece center, and means of correcting the template to compensate for the angularity of the helical gashes in the work piece.

35. In combination, means for supporting and rotating a work piece, means for supporting and applying a tool thereto and a tool so applied and supported, a template, a follower pin in continuous engagement therewith, means to so support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, said work piece having spiral gashes forming teeth therein, said teeth overhanging with their cutting faces at an angle to the radii passing through the work piece center, and means of correcting the template to compensate for the angularity of the helical gashes in the work piece.

36. In combination, means for rotating a work piece, means for supporting and applying a tool to the work piece, a tool therefor, a template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore and aft of the template and work piece when in the respective extreme positions of the follower pin, said work piece having spiral gashes forming teeth therein, said teeth overhanging with their cutting faces at an angle to the radii passing through the work piece center, and means of correcting the template to compensate for the angularity of the helical gashes in the work piece.

37. In a forming machine, a constant speed spindle for driving a spiral toothed work piece, a cutting tool means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, said work piece having spiral gashes forming teeth therein, said teeth overhanging with their cutting faces at an angle to the radii passing through the work piece center, and means of correcting the template to compensate for the angularity of the helical gashes in the work piece.

38. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, and means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said work piece having spiral gashes forming teeth therein, said teeth overhanging with their cutting faces at an angle to the radii passing through the work piece center, and means of correcting the template to compensate for the angularity of the helical gashes in the work piece.

39. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, said work piece having spiral gashes forming teeth therein, said teeth overhanging with their cutting faces at an angle to the radii passing through the work piece center, and means of correcting the template to compensate for the angularity of the helical gashes in the work piece.

40. In combination, means for rotating a work piece, means of supporting and applying a cutting tool, means for actuating said tool longitudinally and transversely with respect to said work piece, a template and a rocking follower pin, means controlled by the relative movement thereof to impart longitudinal or transverse movement to the tool, whereby said follower pin will follow the contour of the template and the tool will cut the work piece to the form of the template, said work piece having spiral gashes forming teeth therein, said teeth overhanging with their cutting faces at an angle to the radii passing through the work piece center, means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected.

41. In combination, means for supporting and rotating a work piece, means for supporting and applying a tool to the work piece, a template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, said work piece having spiral gashes forming teeth therein, said teeth overhanging with their cutting faces at an angle to the radii passing through the work piece center, means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected.

42. In combination, means for rotating a work piece, means for supporting and applying a tool to the work piece and a tool so applied, a template, a movable follower pin engaging therewith, means controlled by the movement of the follower pin to move the tool and the follower pin simultaneously together as a unit longitudinally and transversely to cause the pin to follow the contour of the template and the tool to cut the work piece into a form similar to the outline of the template, said work piece having spiral gashes forming teeth therein, said teeth overhanging with their cutting faces at an angle to the radii passing through the work piece center, means of correcting the template to compensate for the angularity of the helical gashes in the work piece, means of relieving the tool from the work and applying it to the work so that the tool will be applied to the leading edge of each tooth despite the helical nature of the teeth, and will take the uniform cut as determined by the correction of the template and in the configuration of the template save as corrected.

43. In combination, means for rotating a work piece, means for supporting and applying a tool to the work piece, a cutting tool so supported and applied, a template, a rocking follower pin engaging said template and supported for movement with the tool, means controlled by the rocking movement of the follower pin as it is rocked by engagement with the template or disengagement therefrom to actuate said tool and follower pin longitudinally and transversely to maintain said follower pin and in engagement continuously with the template and the tool in engagement continuously with the work piece, whereby the tool cuts an outline on the work piece similar to the outline of the template, said work piece having spiral gashes forming teeth therein, said teeth overhanging with their cutting faces at an angle to the radii passing through the work piece center, means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected.

44. In combination, means for supporting and rotating a work piece, means for supporting and applying a tool thereto and a tool so applied and supported, a template, a follower pin in continuous engagement therewith, means to so support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, said work piece having spiral gashes forming teeth therein, said teeth overhanging with their cutting faces at an angle to the radii passing through the work piece center, means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected.

45. In combination, means for rotating a work piece, means for supporting and applying a tool to the work piece, a tool therefor, a template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore and aft of the template and work piece when in the respective extreme positions of the follower pin, said work piece having spiral gashes forming teeth therein, said teeth overhanging with their cutting faces at an angle to the radii passing through the work piece center, means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected.

46. In a forming machine, a constant speed spindle for driving a spiral toothed work piece, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, said work piece having spiral gashes forming teeth therein, said teeth overhanging with their cutting faces at an angle to the radii passing through the work piece center, means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected.

47. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said work piece having spiral gashes forming teeth therein, said teeth overhanging with their cutting faces at an angle to the radii passing through the work piece center, means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected.

48. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, said work piece having spiral gashes forming teeth therein, said teeth overhanging with their cutting faces at an angle to the radii passing through the work piece center, means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected.

49. In combination, means for rotating a work piece, means of supporting and applying a cutting tool, means for actuating said tool longitudinally and transversely with respect to said work piece, a template and a rocking follower pin, means controlled by the relative movement thereof to impart longitudinal or transverse movement to the tool, whereby said follower pin will follow the contour of the template and the tool will cut the work piece to the form of the template, said work piece having spiral gashes forming teeth therein, said teeth overhanging with their cutting faces at an angle to the radii passing through the work piece center, means of correcting the template to compensate for the angularity of the helical gashes in the work piece, means of relieving the tool from the work and applying it to the work so that the tool will be applied to the leading edge of each tooth despite the helical nature of the teeth and will take the uniform cut as determined by the correction of the template and in the configuration of the template save as corrected, and means operating the spindle speed and work piece speed continuously uniformly and synchronously with the relieving movements of the tool.

50. In combination, means for supporting and rotating a work piece, means for supporting and applying a tool to the work piece, a template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, said work piece having spiral gashes forming teeth therein, said teeth overhanging with their cutting faces at an angle to the radii passing through the work piece center, means of correcting the template to compensate for the angularity of the helical gashes in the work piece, means of relieving the tool from the work and applying it to the work so that the tool will be applied to the leading edge of each tooth despite the helical nature of the teeth and will take the uniform cut as determined by the correction of the template and in the configuration of the template save as corrected, and means operating the spindle speed and work piece speed continuously uniformly and synchronously with the relieving movements of the tool.

51. In combination, means for rotating a work piece, means for supporting and applying a tool to the work piece and a tool so applied, a template, a movable follower pin engaging therewith, means controlled by the movement of the follower pin to move the tool and the follower pin simultaneously together as a unit longitudinally and transversely to cause the pin to follow the contour of the template and the tool to cut the work piece into a form similar to the outline of the template, said work piece having spiral gashes forming teeth therein, said teeth overhanging with their cutting faces at an angle to the radii passing through the work piece center, means of correcting the template to compensate for the angularity of the helical gashes in the work piece, means of relieving the tool from the work and applying it to the work so that the tool will be applied to the leading edge of each tooth despite the helical nature of the teeth, and will take the uniform cut as determined by the correction of the template and in the configuration of the template save as corrected, and means operating the spindle speed and work piece speed continuously uniformly and synchronously with the relieving movements of the tool.

52. In combination, means for rotating a work piece, means for supporting and applying a tool to the work piece, and a cutting tool so supported and applied, a template, a rocking follower pin engaging said template and supported for movement with the tool, means controlled by the rocking movement of the follower pin as it is rocked by engagement with the template or disengagement therefrom to actuate said tool and follower pin longitudinally and transversely to maintain said follower pin and in engagement continuously with the template and the tool in engagement continuously with the work piece, whereby the tool cuts an outline on the work piece similar to the outline of the template, said work piece having spiral gashes forming teeth therein, said teeth overhanging with their cutting faces at an angle to the radii passing through the work piece center, and means for correcting the template to compensate for the angularity of the helical gashes in the work piece, and means of relieving the tool from the work and applying it to the work so that the tool will be applied to the leading edge of each tooth despite the helical nature of the teeth, and will take the uniform cut as determined by the correction of the template and in the configuration of the template save as corrected, and operating the spindle speed and work piece speed continuously uniformly and synchronously with the relieving movements of the tool.

53. In combination, means for supporting and rotating a work piece, means for supporting and applying a tool thereto and a tool so applied and supported, a template, a follower pin in continuous engagement therewith, means to so support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, said work piece having spiral gashes forming teeth therein, said teeth overhanging with their cutting faces at an angle to the radii passing through the work piece center, and means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected, and operating the spindle speed and work piece speed continuously uniformly and synchronously with the relieving movements of the tool.

54. In combination, means for rotating a work piece, means for supporting and applying a tool to the work piece, a tool therefor, a template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore an aft of the template and work piece when in the respective extreme positions of the follower pin, said work piece having spiral gashes forming teeth therein, said teeth overhanging with their cutting faces at an angle to the radii passing through the work piece center, and means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected, and operating the spindle speed and work piece speed continuously uniformly and synchronously with the relieving movements of the tool.

55. In a forming machine, a constant speed spindle for driving a spiral toothed work piece, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, said work piece having spiral gashes forming teeth therein, said teeth overhanging with their cutting faces at an angle to the radii passing through the work piece center, and means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected, and operating the spindle speed and work piece speed continuously uniformly and synchronously with the relieving movements of the tool.

56. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said work piece having spiral gashes forming teeth therein, said teeth overhanging with their cutting faces at an angle to the radii passing through the work piece center, and means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected, and operating the spindle speed and work piece speed continuously uniformly and synchronously with the relieving movements of the tool.

57. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, said work piece having spiral gashes forming teeth therein, said teeth overhanging with their cutting faces at an angle to the radii passing through the work piece center, and means of correcting the template to compensate for the angularity of the helical gashes in the work piece, and means of relieving the tool from the work and applying it to the work so that the tool will be applied to the leading edge of each tooth despite the helical nature of the teeth and will take the uniform cut as determined by the correction of the template and in the configuration of the template save as corrected, and operating the spindle speed and work piece speed continuously uniformly and synchronously of the relieving movements of the tool.

58. In combination, driving means for continuously uniformly rotating a work piece having helical gashes forming teeth, means for supporting and applying a tool thereto, means for moving said tool transversely and longitudinally of the work piece, means driven in synchronism with the driving means for the work piece for independently reciprocating the tool with respect to the work piece and applying the work piece at each reapplication on the leading edge of the helical tooth being cut, and means for modifying the synchronous movement of the tool with the work piece in direct proportion to the helical twist of the gashes in the work piece.

59. In combination, driving means for continuously uniformly rotating a work piece having helical gashes forming teeth, means for supporting and applying a tool thereto, means for moving said tool transversely and longitudinally of the work piece, means driven in synchronism with the driving means for the work piece for independently reciprocating the tool with respect to the work piece and applying the work piece at each reapplication on the leading edge of the helical tooth being cut, means for modifying the synchronous movement of the tool with the work piece in direct proportion to the helical twist of the gashes in the work piece, a template and a rocking follower pin movable longitudinally and transversely with the means supporting the tool, and means controlled by the rocking movements of the follower pin as it follows the margin of the template for moving the follower pin and the tool so that the follower pin will follow the template and the tool will cut continuously, save as it is relieved at the gashes in the work piece, the contour of the work piece being similar to the contour in the template.

60. In combination, means for continuously uniformly rotating a work piece having helical gashes forming teeth, means for supporting and applying a tool thereto, means for moving said tool transversely and longitudinally of the work piece, means driven in synchronism with the driving means for the work piece for independently reciprocating the tool with respect to the work piece and applying the work piece at each reapplication on the leading edge of the helical tooth being cut, means for modifying the synchronous movement of the tool with the work piece in direct proportion to the helical twist of the gashes in the work piece, a template and a rocking follower pin movable longitudinally and transversely with the means supporting the tool, and means controlled by the rocking movements of the follower pin as it follows the margin of the template for moving the follower pin and the tool so that the follower pin will follow the template and the tool will cut continuously, save as it is relieved at the gashes in the work piece, the contour of the work piece being similar to the contour in the template in a continuous spiral movement.

61. In combination, means for rotating a work piece, means for applying a tool to the work piece, a tool, a follower pin supported for bodily transverse and longitudinal movement with the tool, a pivoted template in continuous engagement with the follower pin, and means controlled by the movement of the follower pin imparted to it by its engagement with the edge of the template in following the edge of the template for imparting longitudinal and transverse movement to the follower pin and template to cause the follower pin and template to respectively follow the template and cut the work in the configuration of the template, whereby said cutting tool takes a continuous spiral cut on said work to reduce it to the outline and form of the template.

62. In combination, means for rotating a work piece, means for applying a tool to the work piece, a tool, a follower pin supported for bodily transverse and longitudinal movement with the tool, a template in continuous engagement with the follower pin, means controlled by the movement of the follower pin imparted to it by its engagement with the edge of the template in following the edge of the template for imparting longitudinal and transverse movement to the follower pin to cause the follower pin to follow the template and cut the work in the configuration of the template, whereby said cutting tool takes a continuous spiral cut on said work to reduce it to the outline and form of the template, said work piece having gashes therein of helical form, and means of relieving the tool and applying it irrespective of its longitudinal and transverse movements at synchronous intervals, whereby the point of the tool is applied to the leading edge of each tooth after having cut in its spiral path of cutting the preceding tooth.

63. In combination, means for rotating a work piece, means of supporting and applying a cutting tool, means for actuating said tool longitudinally and transversely with respect to said work piece, a tiltable template and a rocking follower pin, means controlled by the relative movement thereof to impart longitudinal or transverse movement to the tool, whereby said follower pin will follow the contour of the template and the tool will cut the work piece to the form of the template, electric motors for imparting longitudinal and transverse movements to the tool and follower pin, and electric circuits controlled by the movements of the follower pin for alternately operating said motors.

64. In combination, means for supporting and rotating a work piece, means for supporting and applying a tool to the work piece, a tiltable template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, electric motors for imparting longitudinal and transverse movements to the tool and follower pin, and electric circuits controlled by the movements of the follower pin for alternately operating said motors.

65. In combination, means for rotating a work piece, means for supporting and applying a tool to the work piece and a tool so applied, a tiltable template, a movable follower pin engaging therewith, means controlled by the movement of the follower pin to move the tool and the follower pin simultaneously together as a unit longitudinally and transversely to cause the pin to follow the contour of the template and the tool to cut the work piece into a form similar to the outline of the template, electric motors for imparting longitudinal and transverse movements to the tool and follower pin, and electric circuits controlled by the movements of the follower pin for alternately operating said motors.

66. In combination, means for rotating a work piece, means for supporting and applying a tool to the work piece, a cutting tool so supported and applied, a corrected template, a rocking follower pin engaging said template and supported for movement with the tool, means controlled by the rocking movement of the follower pin as it is rocked by engagement with the template or disengagment therefrom to actuate said tool and follower pin longitudinally and transversely to maintain said follower pin and in engagement continuously with the template and the tool in engagement continuously with the work piece, whereby the tool cuts an outline on the work piece similar to the outline of the template, electric motors for imparting longitudinal and transverse movements to the tool and follower pin, and electric circuits controlled by the movements of the follower pin for alternately operating said motors.

67. In combination, means for supporting and rotating a work piece, means for supporting and applying a tool thereto and a tool so applied and supported, a corrected template, a follower pin in continuous engagement therewith, means to so support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, electric motors for imparting longitudinal and transverse movements to the tool and follower pin, and electric circuits controlled by the movements of the follower pin for alternately operating said motors.

68. In combination, means for rotating a work piece, means for supporting and applying a tool to the work piece, a tool therefor, a corrected template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore and aft of the template and work piece when in the respective extreme positions of the follower pin, electric motors for imparting longitudinal and transverse movements to the tool and follower pin, and electric circuits controlled by the movements of the follower pin for alternately operating said motors.

69. In a forming machine, a constant speed spindle for driving a spiral toothed work piece, a cutting tool, means to reciprocate the tool a uniform distance to and from the work piece, means to move the tool bodily longitudinally and transversely of the work, means to vary the time of movement of the tool as the tool moves longitudinally or the work piece, a corrected template, a rocking follower pin therefor, means controlled by the rocking of the pin while the pin follows the template to regulate the means moving the tool bodily longitudinally and horizontally of the work, electric motors for imparting longitudinal and transverse movements to the tool and follower pin, and electric circuits controlled by the movements of the follower pin for alternately operating said motors.

70. In a forming machine, a constant speed spindle for driving a spiral toothed work piece with non-radial toothed faces, a cutting tool, means connected to the spindle to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, electric motors for imparting longitudinal and transverse movements to the tool and follower pin, and electric circuits controlled by the movements of the follower pin for alternately operating said motors.

71. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a corrected template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, electric motors for imparting longitudinal and transverse movements to the tool and follower pin, and electric circuits controlled by the movements of the follower pin for alternately operating said motors.

72. In combination, means for rotating a work piece, means of supporting and applying a cutting tool, means for actuating said tool longitudinally and transversely with respect to said work piece, a tiltable template, a rocking follower pin, means controlled by the relative movement thereof to impart longitudinal or transverse movement to the tool, whereby said follower pin will follow the contour of the template and the tool will cut the work piece to the form of the template, means to operate said work piece at a continuously uniform speed, electric motors for imparting longitudinal and transverse movements to the tool and follower pin, and electric circuits controlled by the movements of the follower pin for alternately operating said motors.

73. In combination, means for supporting and rotating a work piece, means for supporting and applying a tool to the work piece, a corrected template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, means to operate said work piece at a continuously uniform speed, electric motors for imparting longitudinal and transverse movements to the tool and follower pin, and electric circuits controlled by the movements of the follower pin for alternately operating said motors.

74. In combination, means for rotating a work piece, means for supporting and applying a tool to the work piece and a tool so applied, a tiltable and corrected template, a movable follower pin engaging therewith, means controlled by the movement of the follower pin to move the tool and the follower pin simultaneously together as a unit longitudinally and transversely to cause the pin to follow the contour of the template and the tool to cut the work piece into a form similar to the outline of the template, means to operate said work piece at a continuously uniform speed, electric motors for imparting longitudinal and transverse movements to the tool and follower pin, and electric circuits controlled by the movements of the follower pin for alternately operating said motors.

75. In combination, means for rotating a work piece, means for supporting and applying a tool to the work piece, a cutting tool so supported and applied, a tiltable and corrected template, a rocking follower pin engaging said template and supported for movement with the tool, means controlled by the rocking movement of the follower pin as it is rocked by engagement with the template or disengagement therefrom to actuate said tool and follower pin longitudinally and transversely to maintain said follower pin and in engagement continuously with the template and the tool in engagement continuously with the work piece, whereby the tool cuts an outline on the work piece similar to the outline of the template, and means to operate said work piece at a continuously uniform speed, electric motors for imparting longitudinal and transverse movements to the tool and follower pin, and electric circuits controlled by the movements of the follower pin for alternately operating said motors.

76. In combination, means for supporting and rotating a work piece, means for supporting and applying a tool thereto and a tool so applied and supported, a template, a follower pin in continuous engagement therewith, means to so support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, means to operate said work piece at a continuously uniform speed, electric motors for imparting longitudinal and transverse movements to the tool and follower pin, and electric circuits controlled by the movements of the follower pin for alternately operating said motors.

77. In combination, means for rotating a work piece, means for supporting and applying a tool to the work piece, a tool therefor, a template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore and aft of the template and work piece when in the respective extreme positions of the follower pin, means to operate said work piece at a continuously uniform speed, electric motors for imparting longitudinal and transverse movements to the tool and follower pin, and electric circuits controlled by the movements of the follower pin for alternately operating said motors.

78. In a forming machine, a constant speed spindle for driving a spiral toothed work piece, a cutting tool, means to reciprocate the tool a uniform distance to and from the work piece, means to move the tool bodily longitudinally and transversely of the work, means to vary the time of movement of the tool as the tool moves longitudinally of the work piece, a corrected template, a rocking follower pin therefor, means controlled by the rocking of the pin while the pin follows the template to regulate the means moving the tool bodily longitudinally and horizontally of the work, means to operate said work piece at a continuously uniform speed, electric motors for imparting longitudinal and transverse movements to the tool and follower pin, and electric circuits controlled by the movements of the follower pin for alternately operating said motors.

79. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a tiltable template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, means to operate said work piece at a continuously uniform speed, electric motors for imparting longitudinal and transverse movements to the tool and follower pin, and electric circuits controlled by the movements of the follower pin for alternately operating said motors.

80. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a corrected template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, means to operate said work piece at a continuously uniform speed, electric motors for imparting longitudinal and transverse movements to the tool and follower pin, and electric circuits controlled by the movements of the follower pin for alternately operating said motors.

81. In combination, means for rotating a work piece, means of supporting and applying a cutting tool, means for actuating said tool longitudinally and transversely with respect to said work piece, a corrected template, a rocking follower pin, means controlled by the relative movement thereof to impart longitudinal or transverse movement to the tool, whereby said follower pin will follow the contour of the template and the tool will cut the work piece to the form of the template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

82. In combination, means for supporting and rotating a work piece, means for supporting and applying a tool to the work piece, a tiltable template of the outline to which it is desired to cut the work piece, a follower pin pivotally supported with respect to the template having one end engaging the template, means controlled by the movement of the pin as it is actuated by engagement with the template to cause simultaneous movement of the follower pin with respect to the template and of the tool with respect to the work longitudinally and transversely thereof, whereby the follower pin and tool will, respectively, continuously engage the template and work and the tool will cut a form on the work similar to the outline of the template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

83. In combination, means for rotating a work piece, means for supporting and applying a tool to the work piece and a tool so applied, a tiltable template, a movable follower pin engaging therewith, means controlled by the movement of the follower pin to move the tool and the follower pin simultaneously together as a unit longitudinally and transversely to cause the pin to follow the contour of the template and the tool to cut the work piece into a form similar to the outline of the template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

84. In combination, means for rotating a work piece, means for supporting and applying a tool to the work piece, a cutting tool so supported and applied, a tiltable template, a rocking follower pin engaging said template and supported for movement with the tool, means controlled by the rocking movement of the follower pin as it is rocked by engagement with the template or disengagement therefrom to actuate said tool and follower pin longitudinally and transversely to maintain said follower pin and in engagement continuously with the template and the tool in engagement continuously with the work piece, whereby the tool cuts an outline on the work piece similar to the outline of the template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

85. In combination, means for supporting and rotating a work piece, means for supporting and applying a tool thereto and a tool so applied and supported, a template, a follower pin in continuous engagement therewith, means to so support the follower pin so that it can assume opposite extreme positions and a neutral position, means controlled by said follower pin to normally move said follower pin and tool together longitudinally of the template and work and in one of the extreme positions to move the tool and follower pin away from the template and work and the other extreme position to the template and work, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

86. In combination, means for rotating a work piece, means for supporting and applying a tool to the work piece, a tool therefor, a tiltable template, a follower pin rockingly supported with respect to the template and tool but adapted to move bodily as a unit with the tool longitudinally and transversely, said follower pin being adapted to assume oppositely-disposed extreme positions and an intermediate neutral position, means controlled by the positions of said follower pin to normally move said tool and follower pin transversely of the work and template when the follower pin is in its neutral position and longitudinally fore and aft of the template and work piece when in the respective extreme positions of the follower pin, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

87. In a forming machine, a constant speed spindle for driving a spiral toothed work piece, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

88. In a forming machine, a constant speed spindle for driving a spiral toothed work piece with non-radial toothed faces, a cutting tool, means to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said work piece having spiral gashes therein, and means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

89. In a forming machine, a constant speed spindle for driving a spiral toothed work piece with non-radial toothed faces, a cutting tool, means operatively connected to the spindle to reciprocate the tool a uniform distance to and from the work piece, means to move the tool bodily longitudinally and transversely of the work, means to vary the time of movement of the tool as the tool moves longitudinally of the work piece, a template, a rocking follower pin therefor, means controlled by the rocking of the pin while the pin follows the template to regulate the means moving the tool bodily longitudinally and horizontally of the work, means to compensate the tool application to the work according to the work piece diameter as said diameter varies longitudinally of the work piece and the fluted spiral teeth so vary in the diameter, said compensating means comprising a corrected template, said work piece having spiral gashes therein, means of removing the tool and applying it at the end and beginning of teeth located between said gashes, whereby the starting of each cut of the tooth will be at the leading edge of each tooth despite the spiral nature of the leading edge of the tooth, electric motors for imparting longitudinal and transverse movements to the tool and follower pin, and electric circuits controlled by the movements of the follower pin for alternately operating said motors.

90. In combination, means for rotating a workpiece to form thereon helical cutting teeth, a cutting tool, a carriage, a tool slide mounted on said carriage, means to reciprocate the tool and its slide on the carriage in synchronism with the rotation of the workpiece, means for actuating said tool carriage longitudinally and transversely with respect to said workpiece, an adjusted template, a rocking follower pin, and means controlled by the relative movement thereof to impart longitudinal or transverse movements to the tool, whereby said follower pin will follow the contour of the template, the adjusted template will vary the effect of the relieving movement as the tool moves lengthwise of the work and the tool will cut the workpiece to the form of the template.

91. In combination, means for supporting and rotating a workpiece to be formed into a relieved milling cutter, a carriage, a tool slide mounted on the carriage, a tool mounted on said slide, means for giving in and out cam control relieving movement to said tool and its slide, means for actuating said tool carriage longitudinally and transversely with respect to said workpiece, a tiltable template and rocking follower pin, and means controlled by the relative movement thereof to impart longitudinal or transverse movement to the tool, whereby the tiltable template varies the effect of the relieving movement as the tool moves lengthwise of the work in order to provide the compensation required to form the helical cutting teeth on the workpiece.

92. In combination, means for rotating a workpiece on which relieved teeth are to be formed, carriage means for supporting a tool slide, a tool slide, a tool mounted thereon, means for giving in and out control relieving movement to the slide and its tool, means to impart bodily movement of the tool longitudinally and transversely of the work, said transverse movement being modified by the relieving movement, a template, a follower pin carried with said carriage and moving therewith engaging said template, and means connected with said follower pin for controlling the longitudinal and transverse movement of the tool to cause it to cut a configuration of the workpiece corresponding to that of the template while the relieving movement to adjust the point of application of the tool to form the teeth on the workpiece varies the effective position of the cutting tool.

93. In combination, means for rotating a workpiece on which helical relieved teeth are to be formed, carriage means for supporting a tool slide, a tool slide, a tool mounted thereon, means for giving in and out control relieving movement to the slide and its tool, means to impart bodily movement of the tool longitudinally and transversely of the work, said transverse movement being modified by the relieving movement, a template, a follower pin carried with said carriage and moving therewith engaging said template, means connected with said follower pin for controlling the longitudinal and transverse movement of the tool to cause it to cut a configuration of the workpiece corresponding to that of the template while the relieving movement to adjust the point of application of the tool to form the teeth on the workpiece varies the effective position of the cutting tool, and means to synchronize the rotation of the workpiece and the in and out control relieving movement in order to adjust the tool position to the angularity of the helical teeth to be cut on the workpiece.

94. In combination, means for supporting a workpiece which is to be formed of varying diameter with relieved helical teeth, means for rotating the work, a tool slide and tool, means for synchronously reciprocating the tool and its slide with respect to the rotation of the workpiece, and means of modifying with synchronized movement according to the helical pitch of the teeth to be formed, means for giving in and out cam control relieving movement which is so synchronized in connection with the rotation of the workpiece, and means for bodily moving the cutting tool longitudinally and transversely of the workpiece to form a predetermined variation in diameter thereof.

95. In combination, means for supporting a workpiece which is to be formed of varying diameter with relieved helical teeth, means for rotating the work, a tool slide and tool, means for synchronously reciprocating the tool and its slide with respect to the rotation of the workpiece, means of modifying with synchronized movement according to the helical pitch of the teeth to be formed, means for giving in and out cam control relieving movement which is so synchronized in connection with the rotation of the workpiece, and means for bodily moving the cutting tool longitudinally and transversely of the workpiece to form a predetermined variation in diameter thereof, said means comprising a rocking follower pin connected to a tool supporting means such as a carriage carrying a tool and its slide, a template, and means controlled by the rocking of the follower pin to modify the longitudinal and transverse bodily movement of the cutting tool for the control of the diameter of the workpiece.

96. In a machine tool, the combination of means for rotating a workpiece to have the cut thereon compensating, helical cutting teeth, a cutting tool, means for giving in and out cam control relieving movement to the tool, an adjusted template adapted to vary the effect of this relieving movement as the tool moves lengthwise of the work, and means for moving the tool lengthwise of the work when so controlled.

CLIFFORD A. BICKEL.
PHILBER A. ABE.